US007865267B2

(12) United States Patent (10) Patent No.: US 7,865,267 B2
Sabe et al. (45) Date of Patent: Jan. 4, 2011

(54) ENVIRONMENT RECOGNIZING DEVICE, ENVIRONMENT RECOGNIZING METHOD, ROUTE PLANNING DEVICE, ROUTE PLANNING METHOD AND ROBOT

(75) Inventors: Kohtaro Sabe, Tokyo (JP); Steffen Gutmann, Tokyo (JP)

(73) Assignee: Sony Corporation, Tokyo (JP)

( * ) Notice: Subject to any disclaimer, the term of this patent is extended or adjusted under 35 U.S.C. 154(b) by 1211 days.

(21) Appl. No.: 10/941,813

(22) Filed: Sep. 16, 2004

(65) Prior Publication Data

US 2005/0131581 A1 Jun. 16, 2005

(30) Foreign Application Priority Data

Sep. 19, 2003 (JP) ............................. 2003-329129

(51) Int. Cl.
*G06F 19/00* (2006.01)
(52) U.S. Cl. ..................... 700/245; 700/252; 700/259; 701/23; 701/301; 345/419; 382/153; 382/154
(58) Field of Classification Search ................. 700/245, 700/252, 259; 701/23, 301; 345/419; 382/153, 382/154
See application file for complete search history.

(56) References Cited

U.S. PATENT DOCUMENTS

| | | | | |
|---|---|---|---|---|
| 5,377,106 | A * | 12/1994 | Drunk et al. | 701/25 |
| 5,748,199 | A * | 5/1998 | Palm | 345/473 |
| 6,850,818 | B2 * | 2/2005 | Sabe et al. | 700/257 |
| 7,386,163 | B2 * | 6/2008 | Sabe et al. | 382/153 |
| 7,747,055 | B1 * | 6/2010 | Vining et al. | 382/131 |
| 2001/0024514 | A1 | 9/2001 | Matsunaga | |
| 2003/0176946 | A1* | 9/2003 | Maeda | 700/245 |

(Continued)

FOREIGN PATENT DOCUMENTS

JP 60-200314 10/1985

(Continued)

*Primary Examiner*—Khoi Tran
*Assistant Examiner*—Jorge O Peche
(74) *Attorney, Agent, or Firm*—Oblon, Spivak, McClelland, Maier & Neustadt, L.L.P.

(57) ABSTRACT

An environment recognizing device and an environment recognizing method can draw an environment map for judging if it is possible to move a region where one or more than one steps are found above or below a floor, a route planning device and a route planning method that can appropriately plan a moving route, using such an environment map and a robot equipped with such an environment recognizing device and a route planning device. The robot comprises an environment recognizing section including a plurality of plane extracting section 401 adapted to compute plane parameters from a parallax image or a distance image and extract a plurality of planes including the floor surface, an obstacle recognizing section 402 adapted to recognize obstacles on the plurality of planes including the floor surface and an environment map updating section 403 adapted to draw an environment map (obstacle map) for each of the planes on the basis of the result of recognition of the obstacle recognizing section 402 and update the existing environment maps and a route planning section 404 adapted to plan a route on the basis of the environment maps. The route planning section 404 selects a plane as route coordinate when an obstacle is found on it in the environment map of the floor surface but not found in the environment map of the plane.

13 Claims, 25 Drawing Sheets

U.S. PATENT DOCUMENTS

| | | | |
|---|---|---|---|
| 2004/0013295 A1* | 1/2004 | Sabe et al. | 382/153 |
| 2004/0030455 A1* | 2/2004 | Hirai et al. | 700/259 |
| 2004/0122556 A1* | 6/2004 | Mori et al. | 700/245 |
| 2004/0133308 A1* | 7/2004 | Kato et al. | 700/245 |
| 2004/0176875 A1* | 9/2004 | Iribe et al. | 700/245 |
| 2004/0249504 A1* | 12/2004 | Gutmann et al. | 700/245 |
| 2005/0036649 A1* | 2/2005 | Yokono et al. | 382/100 |

FOREIGN PATENT DOCUMENTS

| | | | |
|---|---|---|---|
| JP | 60-217412 | | 10/1985 |
| JP | 04-365104 | | 12/1992 |
| JP | 05-223549 | | 8/1993 |
| JP | 05223549 A | * | 8/1993 |
| JP | 11-265454 | | 9/1999 |
| JP | 2003-256811 | | 9/2003 |

* cited by examiner

Dth=10mm

Robot view

Extraction of floor surface

Expression on floor surface

Coordinates transformation

US 7,865,267 B2

ENVIRONMENT RECOGNIZING DEVICE, ENVIRONMENT RECOGNIZING METHOD, ROUTE PLANNING DEVICE, ROUTE PLANNING METHOD AND ROBOT

BACKGROUND OF THE INVENTION

1. Field of the Invention

This invention relates to an environment recognizing device and an environment recognizing method adapted to extract a plane from three-dimensional data including parallax image data and distance image data in an environment where obstacles exist and recognize the obstacles on the extracted plane, to a route planning device and a route planning method adapted to plan a moving route from the current position to a target position on the basis of an environment map obtained by the environment recognition and also to a robot quipped with such an environment recognizing device or a route planning device.

This application claims priority of Japanese Patent Application No. 2003-329129, filed on Sep. 19, 2003, the entirety of which is incorporated by reference herein.

2. Description of Related Art

A "robot" is a machine that is electrically or magnetically driven to do movements that resemble human (living body) actions. In Japan, robots became popular in the late 1960s but many of them were industrial robots including manipulators and transfer robots that were designed to realize automated and unattended production lines in factories.

Recently, efforts have been and being paid to develop utility robots that support people as partners, behaving like men, in various scenes of our daily lives in living environments. Unlike an industrial robot, a utility robot has the ability of learning how to adapt itself to various people having different personalities and various circumstances in different scenes of our daily lives in living environments. For example, "pet type" robots that resemble four-footed animals such as dogs and cats in terms of bodily mechanisms and movements and "human type" or "human-shaped" robots that are designed by using men or some other two-footed animals as model in terms of bodily mechanisms and movements are already being in the stage of practical use.

If compared with industrial robots, utility robots can act to entertain people so that they are sometimes also referred to as entertainment robots. Additionally, some robots of the type under consideration can recognize external circumstances on the basis of the outputs of the external sensors and autonomously behave in response to external information and internal conditions.

Meanwhile, it may be needless to say that it is important for an autonomous robot to have an ability to recognize the environment surrounding it, plan a moving route and move according to the planned moving route. For a robot to recognize the environment, it is necessary to obtain information on the obstacles in the surroundings of the robot. Therefore, the robot needs to detect a plane, which may be a floor, from three-dimensional data including parallax image data and distance image data and recognize the obstacles.

Japanese Patent Application Publication No. 3340599 discloses a plane estimation method that utilizes Hough transformation in order to detect a plane from three-dimensional data for the purpose of accurately obtain distance data on a plane. With the technique described in the above cited patent document, a plane is estimated in a picked up spatial image by dividing a stereo image into small rectangular regions, obtaining distance data from each of the small regions, applying a plane-passing line by means of Hough transformation from the M distance data contained in each large region formed by putting small regions into a group in a horizontal direction and conducting the same operation for all the large regions.

However, as a traveling type robot detects a plane as a floor in this way, a moving route plan is prepared so as to avoid objects on the floor as obstacles. Then, when an autonomously moving robot is designed to detect an object standing from the floor as obstacle, there arises a problem that a staircase on which the robot actually can move is detected as an obstacle so that the robot may judge that it can not move there. For a robot that can step up a staircase may recognize it as an obstacle unless information including the position and profile of the staircase and the fact that the robot can move on it is given to the robot in advance.

SUMMARY OF THE INVENTION

In view of the above identified circumstances of the prior art, it is therefore the object of the present invention to provide an environment recognizing device and an environment recognizing method that can draw an environment map for judging if it is possible to move a region where one or more than one steps are found above or below a floor, a route planning device and a route planning method that can appropriately plan a moving route, using such an environment map and a robot equipped with such an environment recognizing device and a route planning device.

In an aspect of the present invention, the above object is achieved by providing an environment recognizing device to be used by a traveling type robot in an environment containing one or more than one obstacles in order to recognize the environment, the device comprising: a plane detecting means for computing a plane parameter on the basis of input images and detecting a plane on the basis of the plane parameter; an obstacle recognizing means for recognizing an obstacle, if any, on the plane detected by the plane detecting means; and an environment map updating means for drawing an environment map and/or update the existing environment map on the basis of information on the obstacle recognized by the obstacle recognizing means; the plane detecting means being adapted to detect a group of planes including a reference plane to be used as reference and one or more than one other planes substantially parallel to the reference plane; the environment map updating means being adapted to draw an environment map and/or update the existing environment map for the plane carrying an obstacle as recognized by the obstacle recognizing means out of the group of planes.

Thus, according to the present invention, it is possible for a traveling type robot to detect not only a reference plane such as a floor but also a plurality of planes running in parallel with the reference plane and draw an environment map for or update the existing environment of each of the planes. In other words, the robot can produce environment maps to be used for three-dimensionally recognizing the environment.

The reference plane may be the floor or the traveling plane where the robot is moving. Thus, when the traveling type robot is moving on the floor, the floor is used as reference plane. When, on the other hand, the traveling type robot is moving up on a staircase, the plane on which the robot is moving is used as reference plane.

Preferably, each of the planes has a surface area on which the robot can move. Preferably, the difference of height between the reference plane and each of the planes is not greater than a predetermined value. Preferably, the planes other than the reference plane include a plane whose height shows the smallest difference from the height of the reference plane within the scope of recognition of the robot. Then, if the robot is adapted to extract a plane whose height shows a difference from the height of the reference plane that the robot can overcome for traveling. Then, the plane may highly possibly be selected as part of the moving route of the robot.

In another aspect of the invention, there is provided an environment recognizing method to be used by a traveling type robot in an environment containing one or more than one obstacles in order to recognize the environment, the method comprising: a plane detecting step of computing a plane parameter on the basis of input images and detecting a plane on the basis of the plane parameter; an obstacle recognizing step of recognizing an obstacle, if any, on the plane detected in the plane detecting step; and an environment map updating step of drawing an environment map and/or update the existing environment map on the basis of information on the obstacle recognized in the obstacle recognizing step; the plane detecting step being adapted to detect a group of planes including a reference plane to be used as reference and one or more than one other planes substantially parallel to the reference plane; the environment map updating step being adapted to draw an environment map and/or update the existing environment map for the plane carrying an obstacle as recognized in the obstacle recognizing step out of the group of planes.

In still another aspect of the invention, there is provided a route planning device to be used by a traveling type robot in an environment containing one or more than one obstacles in order to plan a traveling route to be followed to move from the current position to a target position, the device comprising: a plane detecting means for computing a plane parameter on the basis of input images and detecting a reference plane to be used as reference on the basis of the plane parameter and a group of planes including one or more than one planes other than the reference plane running substantially in parallel with the reference plane; an obstacle recognizing means for recognizing an obstacle, if any, on each of the group of planes detected by the plane detecting means; an environment map updating means for drawing an environment map and/or update the existing environment map for each of the planes of the group of planes on the basis of information on the obstacle (s) recognized by the obstacle recognizing means; and a route planning means for planning a moving route for the robot on the basis of the environment maps drawn and/or updated by the environment map updating means.

Thus, according to the invention, a robot can have a group of environment maps including three-dimensional environment maps obtained by extracting a plurality of planes running in parallel with each other and acquiring information on the obstacles, if any, on each of the planes and plan a moving route on the basis of the plurality of environment maps. Therefore, the route plan prepared by a route planning device according to the invention can provide a broader scope of movement if compared with a route plan that is prepared only on the basis of a single environment map.

The route planning means can divide each environment map into regions in a predetermined manner, compute the cost necessary for moving in each of the regions to be passed through when moving from the current position of the robot to a target position and plan a moving route on the basis of the computed cost. Therefore, for instance, it can select the least costly route for moving.

The environment maps may include obstacle regions containing one or more than one obstacles, free space regions allowing free movements and unsurveyed regions and, if a first environment map corresponding to the currently traveling plane contains one or more than one obstacle regions, the route planning means refers to a second environment map corresponding to a plane different from the currently traveling plane and, if the obstacle region is a free space region in the second environment map, the obstacle region can be regarded as movable region. If an environment map is only for a floor, an untravelable region may have environment maps for a plurality of planes and moving route candidates can be selected by referring to such environment maps.

In still another aspect of the invention, there is provided a route planning method to be used by a traveling type robot in an environment containing one or more than one obstacles in order to plan a traveling route to be followed to move from the current position to a target position, the method comprising: a plane detecting step of computing a plane parameter on the basis of input images and detecting a reference plane to be used as reference on the basis of the plane parameter and a group of planes including one or more than one planes other than the reference plane running substantially in parallel with the reference plane; an obstacle recognizing step of recognizing an obstacle, if any, on each of the group of planes detected in the plane detecting step; an environment map updating step of drawing an environment map and/or update the existing environment map for each of the planes of the group of planes on the basis of information on the obstacle(s) recognized in the obstacle recognizing step; and a route planning step of planning a moving route for the robot on the basis of the environment maps drawn and/or updated in the environment map updating step.

In still another aspect of the invention, there is provided a robot adapted to move autonomously in an environment containing one or more than one obstacles and having an environment recognizing device for recognizing the environment thereof; the environment recognizing device comprising: a plane detecting means for computing a plane parameter on the basis of input images and detecting a plane on the basis of the plane parameter; an obstacle recognizing means for recognizing an obstacle, if any, on the plane detected by the plane detecting means; and an environment map updating means for drawing an environment map and/or update the existing environment map on the basis of information on the obstacle recognized by the obstacle recognizing means; the plane detecting means being adapted to detect a group of planes including a reference plane to be used as reference and one or more than one other planes substantially parallel to the reference plane; the environment map updating means being adapted to draw an environment map and/or update the existing environment map for the plane carrying an obstacle as recognized by the obstacle recognizing means out of the group of planes.

In still another aspect of the invention, there is provided a robot adapted to autonomously plan a traveling route to be followed to move from the current position to a target position in an environment containing one or more than one obstacles and having a route planning device to be used to recognize the environment and plan a traveling route, the route planning device comprising: a plane detecting means for computing a plane parameter on the basis of input images and detecting a reference plane to be used as reference on the basis of the plane parameter and a group of planes including one or more than one planes other than the reference plane running substantially in parallel with the reference plane; an obstacle recognizing means for recognizing an obstacle, if any, on each of the group of planes detected by the plane detecting means; an environment map updating means for drawing an environment map and/or update the existing environment map for each of the planes of the group of planes on the basis of information on the obstacle(s) recognized by the obstacle recognizing means; and a route planning means for planning a moving route for the robot on the basis of the environment maps drawn and/or updated by the environment map updating means.

Thus, an environment recognizing device and an environment recognizing method according to the invention are adapted to extract a group of planes that are running in parallel with each other and draw a group of environment maps showing the occupancy ratio of the obstacle(s) in each of the planes on the basis of information on the recognized obstacle (s) of the group of planes. Therefore, a robot that can autonomously travel in an environment containing one or more than one obstacles can three-dimensionally grasp the environment.

Thus, a route planning device and a route planning method according to the invention are adapted to plan a moving route by referring to a group of environment maps to be used for three-dimensionally grasping the environment and hence can provide a broader scope of movement. For example, they can plan a moving route including one or more than one staircases on which a traveling type robot can move up.

A robot according to the invention can three-dimensionally grasp the environment where one or more than one obstacles exist on the basis of a group of environment maps obtained from a group of planes including a reference plane that may be a floor and a plurality of planes running in parallel with the reference plane. When such a group of environment maps are utilized to plan a moving route, it is possible to plan a moving route passing through a region, which may be judged to be untravelable if only the environment map drawn by referring to the plane where the robot is currently moving is referred to, by referring to the other environment maps. Thus, the robot can select a staircase or the like and put it in the moving route without any external instruction and perform an action of autonomously moving up on a staircase.

BRIEF DESCRIPTION OF THE DRAWINGS

FIG. 22A is a schematic illustration of the robot trying to move to another room by way of a step and FIG. 22B is a schematic illustration of the environment maps of the two rooms;

DETAILED DESCRIPTION OF THE PREFERRED EMBODIMENTS

Now, the present invention will be described in greater detail by referring to the accompanying drawings that illustrate an embodiment of robot according to the invention. This embodiment of robot is an autonomously travelable robot realized by mounting an environment recognizing device adapted to extract a plurality of planes and draw environment maps showing information on the obstacles, if any, on each of the planes and a route planning device adapted to plan a moving route on the basis of the environment maps drawn by the environment recognizing device.

The environment recognizing device of this embodiment is adapted to extract a reference plane, which may be the plane on which one of the feet of the robot equipped with the device is placed (on foot plane), as reference and a plurality of parallel planes running in parallel with the reference plane. Then, the legged traveling type robot equipped with the device can judge if the steps of a staircase constitute an obstacle or not and if it can move on them or not as the environment recognizing device computes the obstacle occupancy ratio of each of the plurality of parallel planes and draws a map. The robot may judge a region including steps to be not an obstacle and plan a moving route, using the steps as route candidate.

Figure 1:
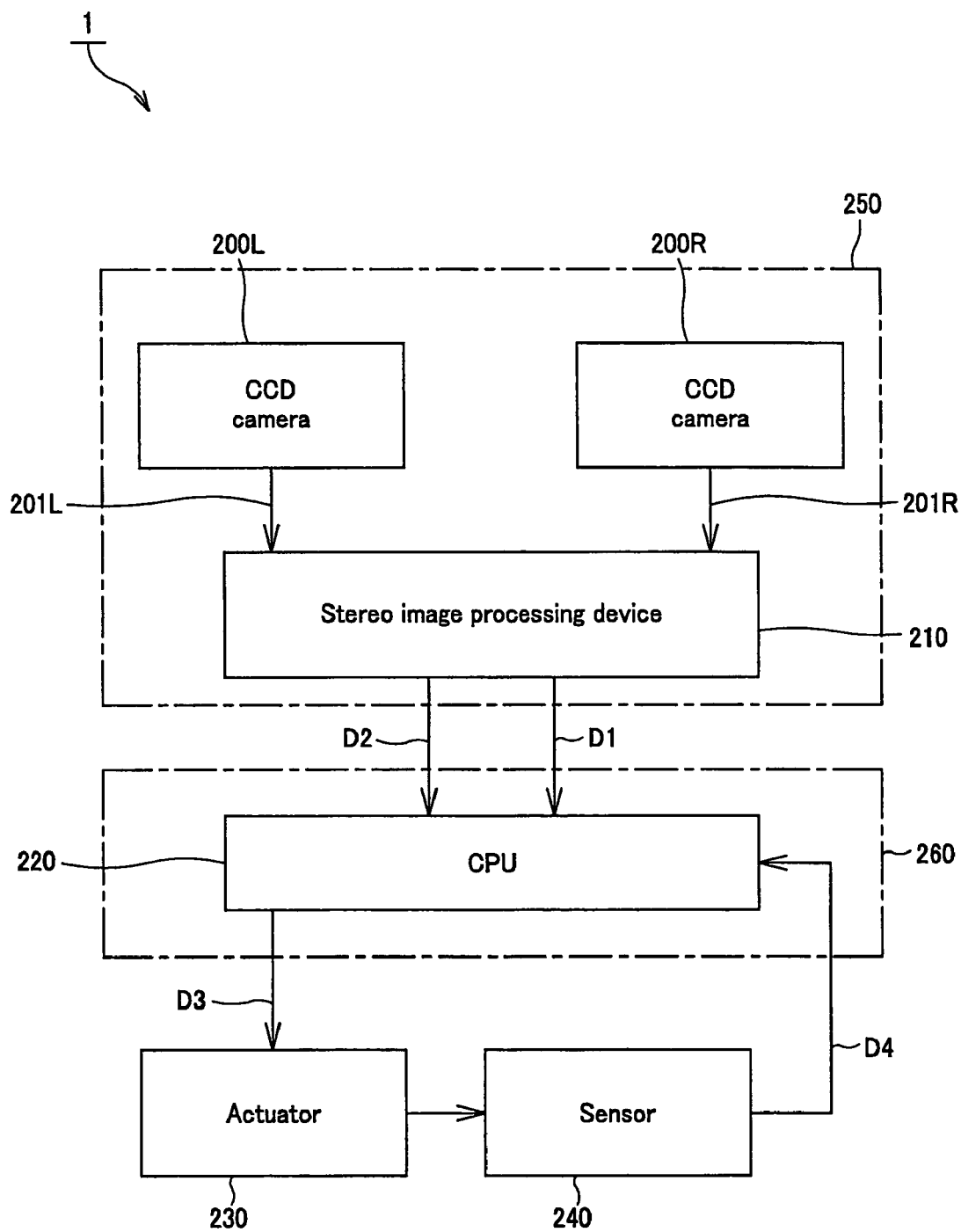
FIG. 1 is a schematic block diagram of an embodiment of robot according to the invention.

This embodiment is a two-footed walking type robot that is equipped with an environment recognizing device and a route planning device and adapted to move autonomously. FIG. 1 is a schematic block diagram of this embodiment of robot. As shown in FIG. 1, the robot 1 has a head unit 3 that is provided with a pair of CCD cameras 200R, 200L and a stereo image processing device 210 arranged downstream relative to the CCD cameras 200R, 200L (to be referred to respectively as right eye 200R and left eye 200L hereinafter). The right eye image 201R and the left eye image 201L picked up by the eyes, or the CCD cameras, are input to the stereo image processing device 210. The stereo image processing device 210 computationally processes the parallax information (disparity data) (distance information) of the images 201R, 201L and produces color images (YUV: luminance Y, UV color difference) D1 and parallax images (YDR: luminance Y, parallax D, reliability R) D2 alternately for left and right for each frame. The term of parallax as used herein refers to the difference between the left eye image and the right eye image of a point in the space, which difference changes as a function of the distances of the point from the respective cameras.

The color images D1 and the parallax images D2 are input to CPU (control section) 220 contained in trunk section 260 of the robot 1. Each of the joints of the robot 1 is provided with one or more than one actuators 230 and the motors of the actuators of each of the joints are driven according to the command value of the control signal D3 fed from the CPU 220 as command. Each of the joints (actuators) is provided with a potentiometer so that the rotary angle of the motor of the actuator is transmitted to the CPU 220. The sensors 240 of the robot including the potentiometers arranged at the respective actuators, the touch sensors of arranged at the soles of the feet and the gyro sensors arranged at the trunk section are used to observe the current state of the robot on the basis of the current angle of each of the joints, the arrangement information, the posture information and other information on the robot and output the information to the CPU 220 as sensor data D4. The CPU 220 receives the color images D1 and the parallax images D2 from the stereo image processing device 210 and the sensor data D4 including data on the angles of all the joints from the actuators 230 as input for the software thereof.

The software of the robot of this embodiment is configured on an object by object basis and designed to recognize the position, the quantity of movement, the obstacles in the surroundings and the environment maps of the robot and performs a processing operation for outputting an action string of actions to be ultimately taken by the robot. The coordinate systems of the robot to be used for indicating the position of the robot typically include the camera coordinate system of a world reference system (to be also referred to as absolute coordinate system hereinafter) having the origin thereof located at a predetermined position selected on the basis of a particular object such as a landmark and a robot-centered coordinate system (to be also referred to as absolute coordinate system hereinafter) having the origin thereof located somewhere in the robot itself.

Figure 2:
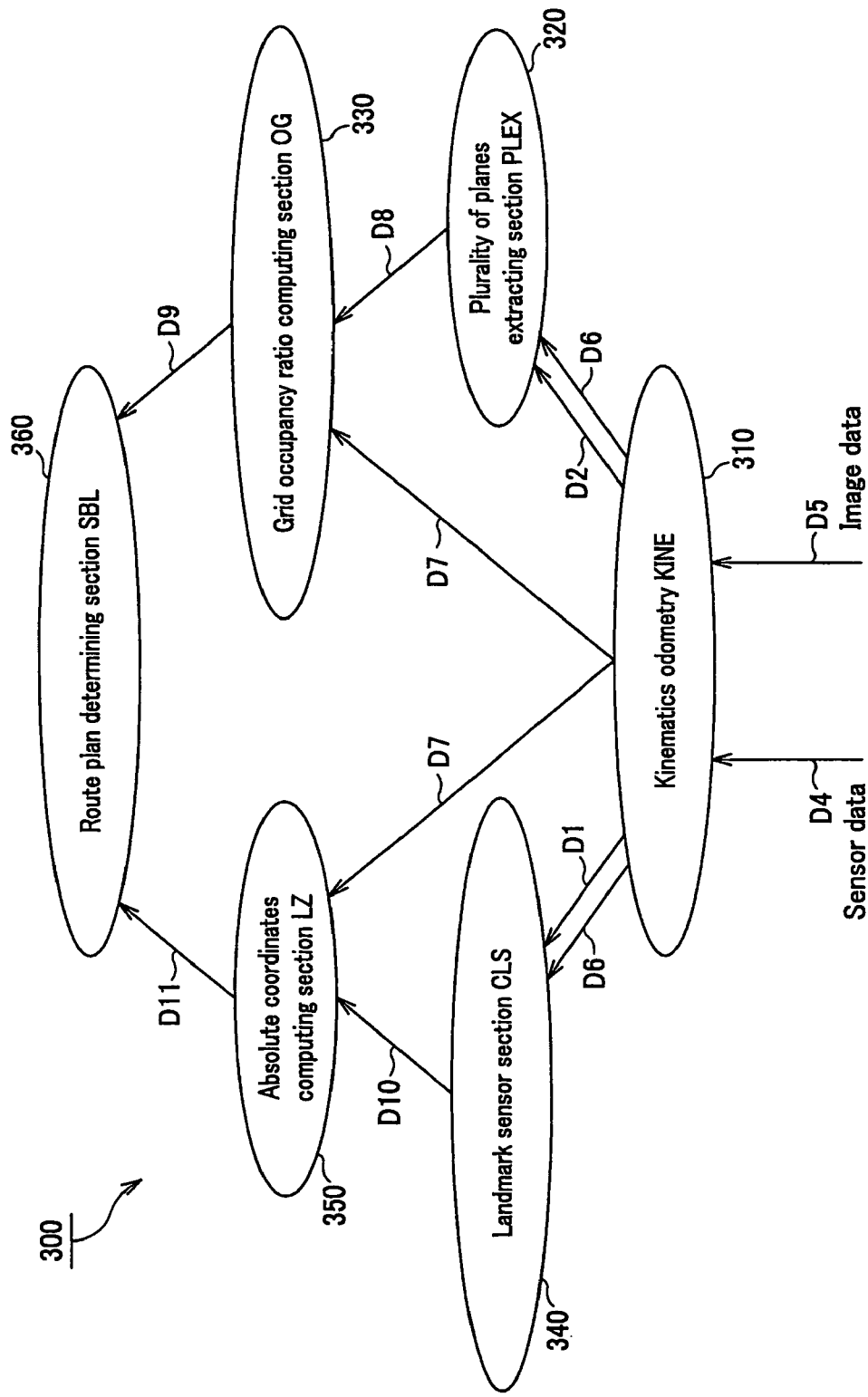
FIG. 2 is a schematic illustration of the software configuration of the robot of FIG. 1.

FIG. 2 is a schematic illustration of the software configuration of the robot of this embodiment. Referring to FIG. 2, each closed circle represents an entity that is referred to as object or process. The entire system operates as objects communicate with each other asynchronously. Each object is driven to exchange data and invoke a program by means of a technique for an inter-object communication, using a shared memory, and message communication.

As shown in FIG. 2, the software 300 comprises a kinematics odometry section KINE 310, a plane extracting section PLEX 320, a grid occupancy ratio computing section (occupancy grid) OG 330, a landmark position detecting section (landmark sensor) CLS 340, an absolute coordinates computing section (localization) LZ 350 and an action determining section (situated behavior layer) SBL 360. The processing operation of the software 300 is carried out on an object by object basis.

Figure 3:
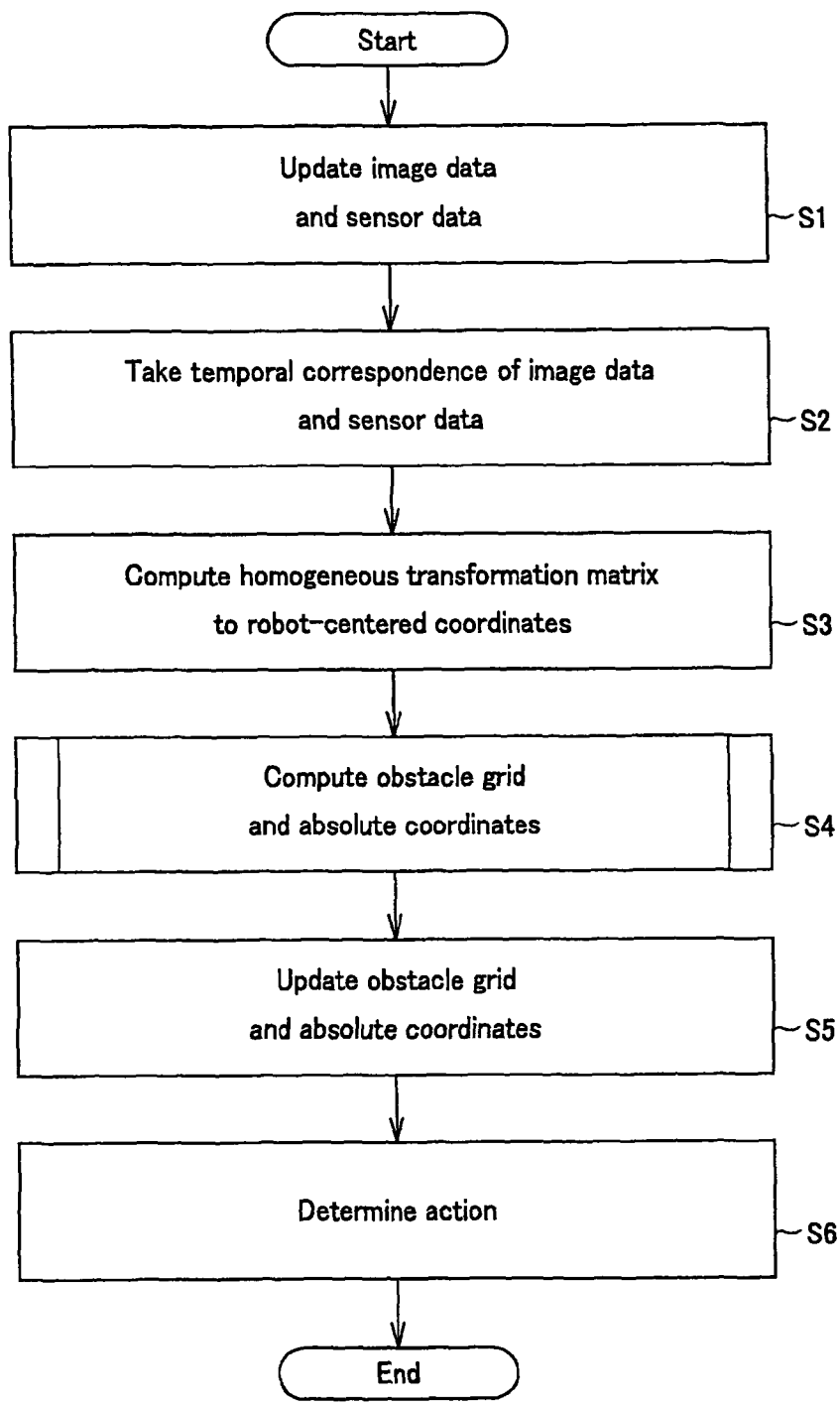
FIG. 3 is a flow chart of operation of the software of the robot of FIG. 1.
Figure 4B:
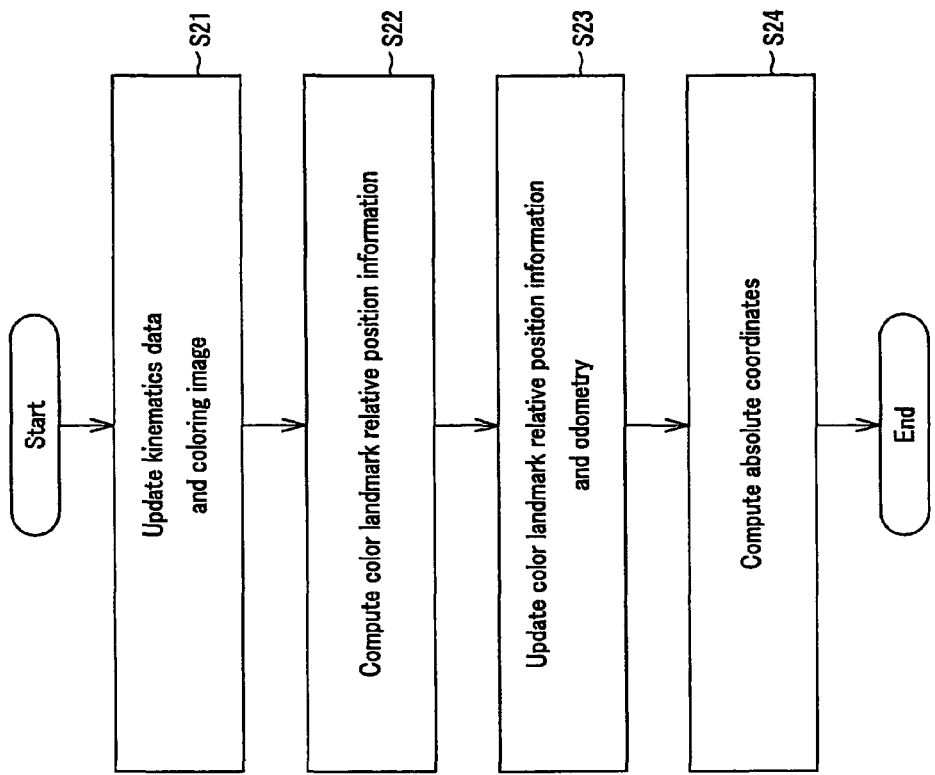
FIG. 4A is a flow chart of operation of computing an obstacle grid and FIG. 4B is a flow chart of operation of computing absolute coordinates, which are used for the robot of FIG. 1.
Figure 4A:
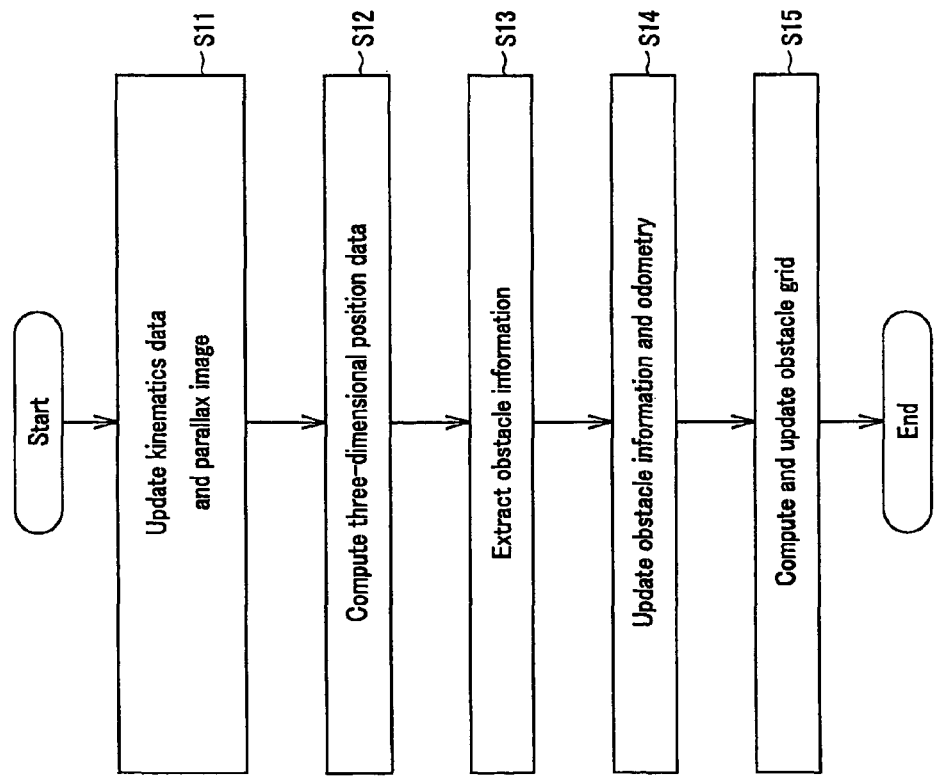

Now, the operation of the software of the robot 1 shown in FIG. 2 will be described below. FIG. 3 is a flow chart of operation of the software 300 of the robot as shown in FIG. 2.

Referring to FIG. 3, image data D5 and sensor data D4 are input to the kinematics odometry section KINE 310 of the software 300 shown in FIG. 2. The image data D5 include the data of the color images D1 and those of the parallax images D2, which are described above. The sensor data D4 include data on the angles of the joints of the robot The kinematics odometry section KINE 310 receives these input data D5, D4 and updates the image data and the sensor data stored in the memory (Step S1).

Then, the kinematics odometry section KINE 310 establishes temporal correspondence between the image data D5 and the sensor data D4 (Step S2). More specifically, it computationally determines the angle of each of the joints of the sensor data D4 at the time when an image of the image data D5 is picked up. Then, it converts the robot-centered coordinate system having the origin thereof located somewhere in the robot 1 into the coordinate system of the cameras 200R/L arranged in the head unit 2, using the data on the angles of the joints (Step S3). The kinematics odometry section KINE 310 is adapted to lead out a homogeneous transformation matrix of the camera coordinate system from the robot-centered coordinate system and transmit the homogeneous transformation matrix D6 and the corresponding image data to the object that recognizes images. More specifically, the kinematics odometry section KINE 310 outputs the homogeneous transformation matrix D6 and the corresponding parallax images D2 to the plurality of planes extracting section PLEX 320 and also the homogeneous transformation matrix D6 and the color images D1 to the landmark position detecting section CLS 340.

Then, the software 300 computes the quantity of movement of the robot 1 on the basis of the walk parameter obtained from the sensor data D4 and the count of the number of steps taken by the robot 1, using the sole sensors and then the quantity of movement of the robot 1 in terms of the robot-centered coordinate system. The quantity of movement of the robot-centered coordinate system may also be referred to as odometry hereinafter. The odometry D7 is then output to the grid occupancy ratio computing section OG 330 and the absolute coordinates computing section LZ 350. Then, the plurality of planes extracting section PLEX 320 and the grid occupancy ratio computing section OG 330 compute and update the grid occupancy ratio (environment map) of the obstacle, while the landmark position detecting section CLS 340 and the absolute coordinates computing section LZ 350 compute and update the absolute coordinates (Steps S4, S5).

The processing operations of the plurality of planes extracting section PLEX 320 and the grid occupancy ratio computing section OG 330 in Steps S4, S5 and those of the landmark position detecting section CLS 340 and the absolute coordinates computing section LZ 350 are conducted simultaneously and concurrently.

More specifically, the operation of computationally determining the obstacle grid in Step S4 proceeds in such a way that, as the homogeneous transformation matrix D6 that includes the kinematics data computed by the kinematics odometry section KINE 310 and the corresponding parallax images D2 obtained from the stereo camera are firstly input to the plurality of planes extracting section PLEX 320 to update the data stored in the memory (Step S11). Then, the three-dimensional positional data (range data) are computed from the parallax images D2 by using the calibration parameter of the stereo camera and other parameters (Step S12). Thereafter, planes other than those of walls and tables are extracted from the range data typically by means of Hough transformation. Additionally, the correspondence to the plane that is touched by either or both of the soles of the robot 1 is obtained from the coordinate transformation matrix D6 and the floor surface is selected, while the distance from the floor surface to a point that is not located on the floor surface, e.g., a point that is located at a position higher than a predetermined threshold value and hence regarded as an obstacle, is computed and the obtained obstacle information D8 is output to the grid occupancy ratio computing section 330 (Step S13).

Furthermore, as will be described in greater detail hereinafter, the plane extracting section PLEX 320 of his embodiment extracts not only the floor surface but also a group of planes including a plurality of planes running in parallel with the floor surface and computes the distance from the floor surface to a point that is not located on the floor surface and hence is regarded as an obstacle as well as the distance from each of the planes to a point that is not located on the plane and hence is regarded as an obstacle. Then, the plane extracting section PLEX 320 outputs the obtained obstacle information to the grid occupancy ratio computing section 330. When the plane on which the robot is moving, e.g., the floor surface, is selected as reference plane and planes that show a small height difference from the reference plane are extracted, the extracted planes will provide effective candidate planes for the robot to move thereon. In other words, environment maps can be drawn by extracting planes that show a small height difference from the floor surface and hence on which the robot can move with priority as will be described in greater detail hereinafter and may be effectively used when a traveling type robot that moves by wheels or that has legs and moves by two feet or four feet carries out the route plan. Planes that are close to the reference plane in terms of distance may be extracted with priority.

As the reference plane and a group of a plurality of planes running in parallel with the reference plane are extracted and the obstacle, if any, on each of the planes is recognized, the obstacle information is output to the grid occupancy ratio computing section 330. While planes running in parallel with the reference plane that may be a floor surface are described in the following, the group of planes may include not only planes running in parallel with the floor surface but also planes showing a small angle relative to the reference plane such as slopes.

As the odometry 314 computationally determined by the kinematics odometry section KINE 310 and the information on the observed obstacle(s) 321 computational determined by the plane extracting section PLEX 320 are input to the grid occupancy ratio computing section OG 330, the data stored in the memory are updated (Step S14). Then, the grid occupancy ratio of each of the obstacles that represents the probability if the obstacle is found on the floor surface or not is probabilistically updated (Step S15).

Additionally, the grid occupancy ratio of each of the obstacles that represents the probability if the obstacle is found on each of the group of planes other than the floor surface is also probabilistically updated.

The grid occupancy ratio computing section OG 330 holds the environment maps showing information on the obstacles (grid occupancy ratios of the obstacles) in the surroundings of the robot 1, e.g., in a circuit of a half diameter of 4 m centered at the robot 1 and attitude information that indicates the angular direction to which the robot turns, and updates the environment maps. Thus, as it outputs the updated result of recognition (obstacle information D8), the route plan determining section SBL 360 of the upper layer, or this embodiment, can prepare a plan for avoiding the obstacles. As described above, the grid occupancy ratio computing section OG 330 receives the plurality of planes and the obstacle information on them from the plane extracting section PLEX 320 so that it is possible to update the environment maps of each of the planes.

On the other hand, for the computation of the absolute coordinates in Step S4, firstly as the homogeneous transformation matrix D6 and the color images D1 are input as kinematics data to the landmark position detecting section CIS 340 from the kinematics odometry section KINE 310, the corresponding data stored in the memory are updated (Step S21). Then, an operation of processing the images D1 is performed to detect any color landmark that the robot 1 is adapted to recognize in advance. Then, the position and the size of the color landmark in the color images D1 are converted the position in the camera coordinate system. Additionally, the homogeneous transformation matrix D6 is used to convert the position of the color landmark in the camera coordinate system to the position in the robot-centered coordinate system and the information on the color landmark in the robot-centered coordinate system (color landmark relative position information) D10 is output to the absolute coordinates computing section LZ 350 (Step S22).

More specifically, the landmark position detecting section CL 340 identifies the own position (position and posture) of the robot 1 from the sensor information of the robot 1 and the action information on the actions made by the robot 1 in an environment that typically contains artificial color landmarks showing a color that may be green, pink, blue or some other color.

As the absolute coordinates computing section LZ 350 receives the odometry D7 from the kinematics odometry section KINE 310 and the color landmark relative position information D10 from the landmark position detecting section CLS 340, it updates the corresponding data stored in the memory (Step S23). Then, the absolute coordinates of the robot (the position of the robot in the world coordinate system) are probabilistically computed, by using the absolute coordinates of the color landmarks (in the world coordinate system) that the absolute coordinates computing section LZ 350 is adapted to recognize in advance, the color landmark relative position information D10 and the odometry D7 (Step S24). Then, the absolute coordinates position D11 is output to the route plan determining section SBL 360.

Returning now to FIG. 3, as the route plan determining section SBL 360 receives the obstacle information D9 of each of the planes from the grid occupancy ratio computing section OG 330 and the absolute coordinates position D11 from the absolute coordinates computing section LZ 350, the corresponding data stored in the memory are updated (Step S5). Then, the route plan determining section SBL 360 acquires the result of recognition on the obstacle(s) found in the surroundings of the robot 1 on the basis of the obstacle information D9 from the grid occupancy ratio computing section OG 330 and the current absolute coordinates of the robot 1 from the absolute coordinates computing section LZ 350 and generates a route along which the robot can walk to get to the target point that is expressed in terms of the absolute coordinate system or the robot-centered coordinate system of the robot without colliding with any obstacle. Then, the route plan determining section SBL 360 issues an action command to move along the route. In other words, the route plan determining section SBL 360 determines the actions to be taken by the robot 1 that depends on the circumstances on the basis of the input data and outputs the action string (Step S6).

When the robot is navigated by the user, it may be so arranged that the result of recognition on the obstacles existing in the surroundings of the robot that is given from the grid occupancy ratio computing section OG 330 and the absolute coordinates of the current position of the robot that are given from the absolute coordinates computing section LZ 350 are provided to the user and an action command is issued in response to a user input.

Thus, the robot of this embodiment can broaden the scope of actions it can take if compared with a situation where it only possesses an environment map of the floor surface because it extracts a group of a plurality of planes including the floor surface by means of the plane extracting section PLEX 320, draws environment maps showing the obstacle occupancy ratios of the plurality of planes and generates a route plan on the basis of the group of a plurality of environment maps that correspond to the respective planes. For example, regions where steps such as those of one or more than one staircases can be included in the moving route so that the robot may be able to move through such regions. In other words, when the robot generates a route plan, it can refer not only to an environment map that corresponds to the floor surface where it is moving currently but also to environment maps that correspond to planes running in parallel with the floor surface so as to three-dimensionally grasp the environment and plan a three-dimensional moving route.

Figure 5:
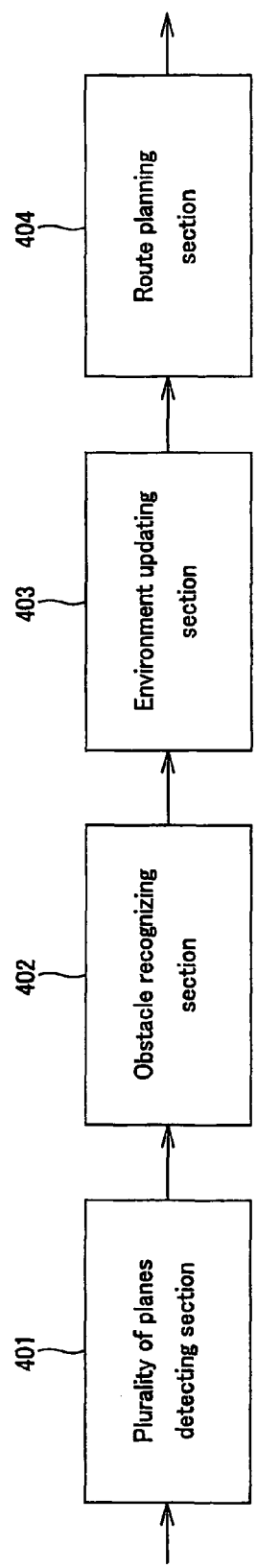
FIG. 5 is a schematic illustration of the functional units that participate in the processing operation from extracting a plurality of planes to planning a moving route of the robot of FIG. 1.

Now, the robot of this embodiment that can extract a plurality of planes running in parallel with each other and prepare a feasible route plan will be described in greater detail below. FIG. 5 is a schematic illustration of the functional units that participate in the processing operation from extracting a plurality of planes to planning a moving route of the robot. In FIG. 5, there are shown an environment recognizing section including a plurality of planes extracting section 401 adapted to compute plane parameters from parallax images or the distance images and extract a plurality of planes, an obstacle recognizing section 402 adapted to recognize the obstacles on the plurality of planes including the floor surface and an environment map updating section 403 adapted to draw environment maps (obstacle maps) on the basis of the result of recognition of the obstacle recognizing section 402 and updates the current environment maps and a route planning section 404 adapted to generate a route plan on the basis of the environment maps. Note that, while these sections are shown as functional blocks in FIG. 5, the above processing operation is conducted on an object by object basis as shown in FIG. 2.

Figure 6:
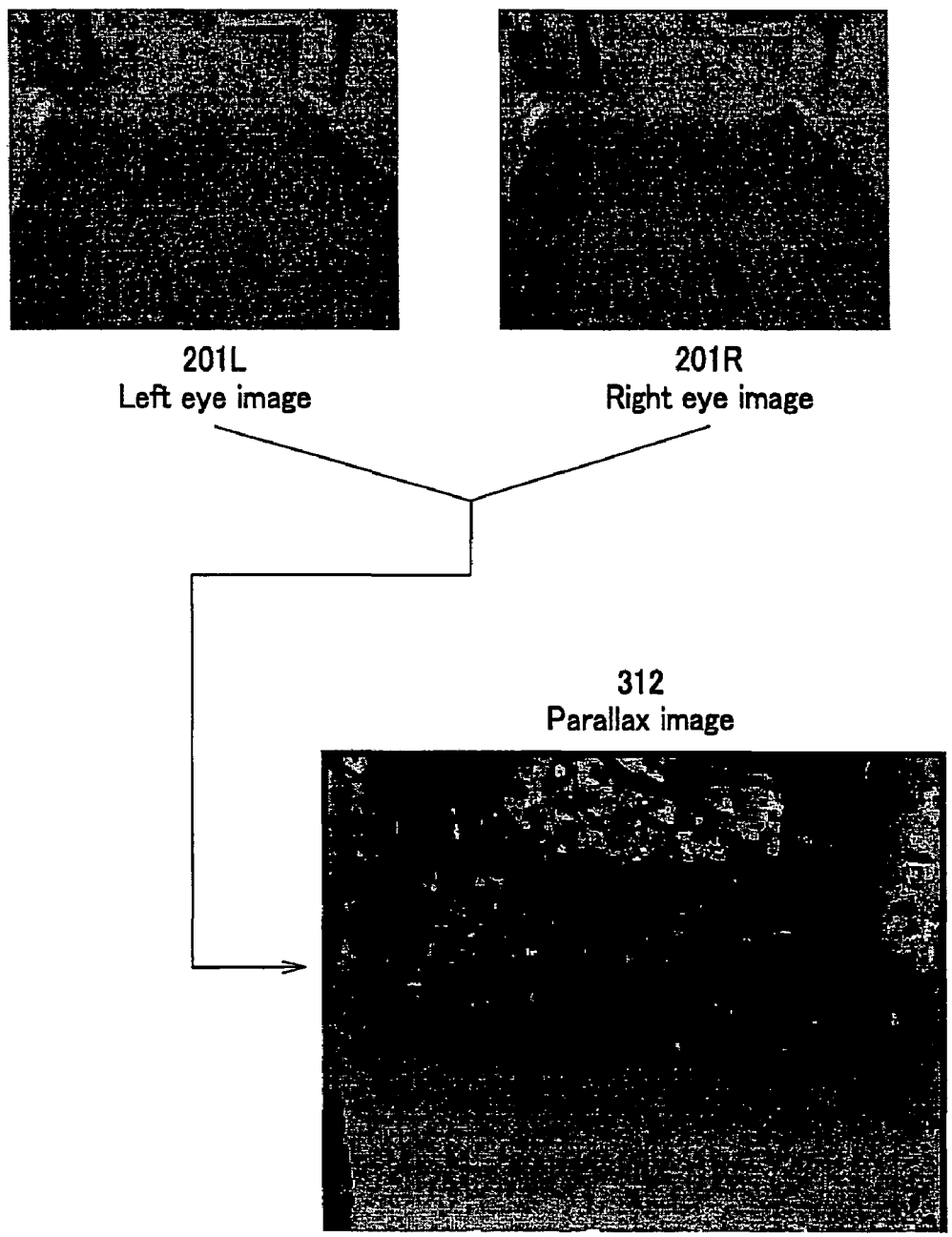
FIG. 6 is a schematic illustration of an operation of generating a parallax image to be used by the robot of FIG. 1 when extracting a plane.
Figure 7:
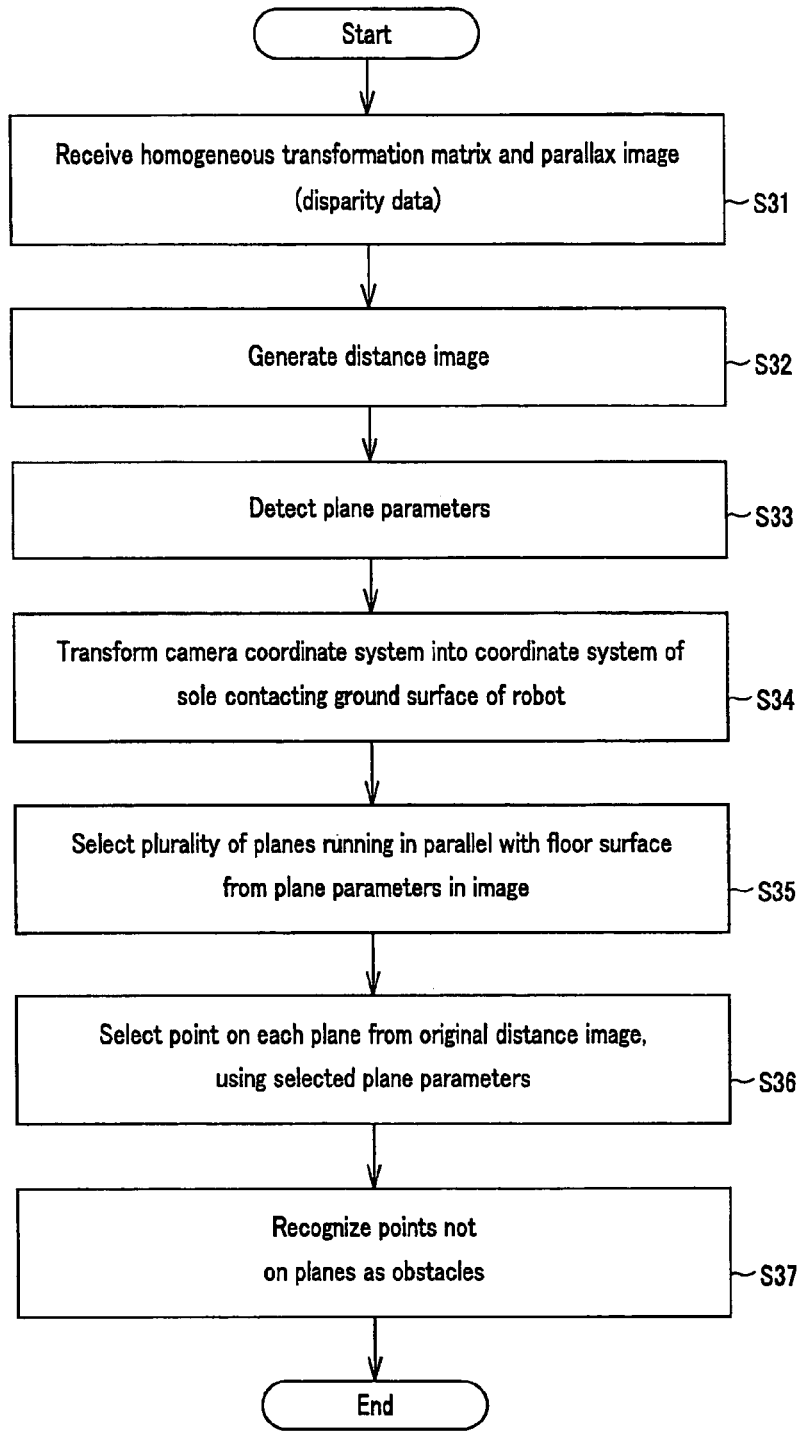
FIG. 7 is a flow chart of operation of the robot of FIG. 1 for recognizing an obstacle from an input image.

The plurality of planes extracting section 401 and the obstacle recognizing section 402 receive a homogenous transformation matrix and a corresponding parallax image obtained from a left eye image 201L and a right eye image 201R as shown in FIG. 6 and detects plane parameters, following the processing sequence illustrated in FIG. 7, to recognize an obstacle, if any.

To detect plane parameters, firstly the plurality of planes detecting section 401 receives a homogenous transformation matrix and a corresponding parallax image (Step S31). The parallax image 312 (or distance image) obtained by means of a stereovision (stereo camera) or by operating a range sensor can be easily converted into three-dimensional data by conversion, using appropriate calibration. In other words, the three-dimensional position data (x, y, z) as viewed from the camera coordinates for each pixel, utilizing the calibration parameter obtained by absorbing the lens distortion and the stereo fitting error from the parallax image, are generated as distance image (Step S32). Each of the three-dimensional data has a specific reliability parameter that is obtained on the basis of the reliability of the input image, which may be a parallax image or a distance image, and may be selected or unselected according to the reliability parameter so as to sort out the input data.

Then, data are randomly sampled from the selected three-dimensional data group and planes are assumed by Hough transformation. More specifically, when the direction of a normal vector is ($\theta$, $\phi$) and the distance from the origin is d, a plane parameter ($\theta$, $\phi$, d) is computationally determined and directly polled for a polling space ($\theta$, $\Psi$, d)=($\theta$, $\phi \cos \theta$, d) to assume a plane. As a result, a plane parameter that is dominant in the image is detected (Step S33).

Figure 8:
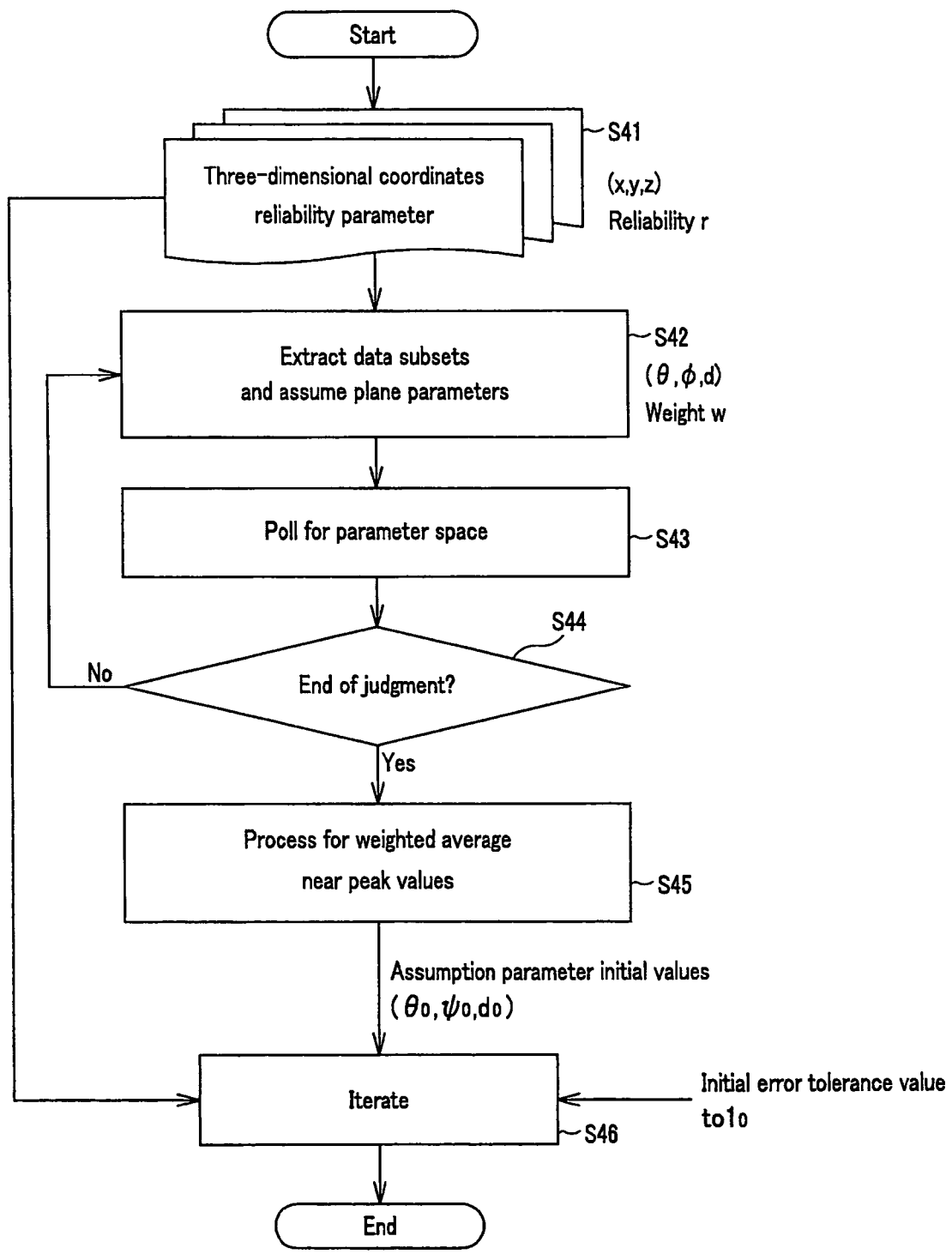
FIG. 8 is a flow chart of operation of the robot of FIG. 1 for detecting a plane parameter.

Now, the method of detecting a plane parameter in Step S33 will be described in greater detail below. The plurality of planes extracting section 401 extracts not only the plane parameter of the plane such as the floor surface that the leg unit of the robot is touching or on which the leg unit is moving (to be referred to as reference plane hereinafter) but also the plane parameters of a plurality of planes running in parallel with the reference plane. FIG. 8 is a flow chart of operation of the robot of FIG. 1 for detecting a plane parameter. As pointed out above, a reliability parameter is computed for each three-dimensional data and the three-dimensional data whose reliability parameter is smaller than a predetermined threshold value is discarded so as to sort out the input data. The selected group of three-dimensional data (x, y, z) and the reliability parameters (reliability r) accompanying the respective data are output (Step S41) and the group of three-dimensional data are sampled to assume a plane parameter (Step S42).

The sampling methods that can be used for sampling the three-dimensional data (x, y, z) includes:

(1) a random sampling method, (2) a method of randomly selecting a reference point from the entire three-dimensional data and then sampling a group of data found near the reference point or found with a distance sufficiently small relative to the reference point in a three-dimensional space out of the remaining data, and (3) a method of scanning the three-dimensional data on a plurality of resolution levels and forming groups of data that are close to each other (e.g. groups of data, in each of which data are separated from each other with a sufficiently small distance in a three-dimensional space) as subsets.

A group of data, in which data are separated from each other with a sufficiently small distance in a three-dimensional space may be such that the distance of each data from the reference point is between a threshold value dmin and another threshold value dmax.

If it is assumed that a dominant single plane is found from the input data or from some other additionally information and the plane has a large area, it is effective to use a technique of sampling the entire image as a broad object of sampling. On the other hand, a technique of sampling the data of a small area is effective when the image to be sampled includes small steps.

Then, plane parameters are computed from the extracted subsets. The most suitable one of the three plane parameter computing methods as described below may be selected.

With the first parameter computing method, it is possible to obtain a plane α that is defined by three parameters (θ, φ, d) including the direction of the normal vector (θ, φ) and the distance d from the origin of the coordinate system as computed from three-dimensional data for three points that are not found on the same straight line, using a direct solution method.

The second parameter computing method is a method of estimating plane parameters by principal component analysis. With this method, plane parameters are obtained by estimation, conducting principal component analysis on each of the groups of data obtained by dividing the three-dimensional data input as a result of scanning the entire image with an appropriate resolution granularity and an appropriate resolution for closely located regions in a three-dimensional space.

The third parameter computing method is a method of using the method of least squares. For example, the distance image obtained by scanning the entire image with an appropriate resolution granularity and an appropriate resolution is divided into small rectangular regions and the obtained groups of three-dimensional data are divided for closely located regions in a three-dimensional space. Then, plane parameters are computed by using the method of least squares.

Thereafter, the obtained plane parameters are polled for a parameter space (Step S43). At this time, since the plane parameters for defining a plane form polar coordinates relative to the original three-dimensional orthogonal coordinate space, robust and highly accurate data can be obtained by designing a polling space so as to make the polling slots (grid) have a same size in the original corresponding space and establish a relationship of (θ, Ψ, d)=(θ, φ cos θ, d) or (θ, Ψ, d)=(2θ sin (2π/4−θ/2) cos Ψ, 2 sin (π/4−θ/2) sin θ, d). Then, the number of samples can be reduced to realize high speed processing. Generally, the weight of a vote is same from vote to vote for polling and therefore a polling value of 1 is given to each vote. However, the robustness relative to noises can be improved by weighting votes, taking the nature of errors into consideration. For example, the polling value of a vote may be made equal to 0.5 or 2 depending on the above described reliability parameters, the standard deviation of the error of the original three-dimensional data that are used for computationally determining the object of polling or the evaluation of the error that is used when the distribution of the original three-dimensional data is projected onto the spherical plane at the center of vision.

Then, it is determined if the total number of votes exceeds a threshold value Nmax or exceeds a threshold value Nmax and the distribution of polling values form a satisfactory peak or not (Step S44). If a satisfactory peak may be obtained when the data of the grid at the position of the peak take a ratio equal to or greater than a predetermined value relative to the total number of votes or when the number of votes or the total of the polling values (acquired polling value) of the grid at the position of the peak is equal to or greater than a predetermined value. On the other hand, if it is determined that a satisfactory peak is obtained, the plane parameters in the grid of the position at or near the peak are processed for weighted average. If it is determined that a satisfactory peak is not obtained, the processing operation returns to Step S42, where data subsets are extracted from the groups of three-dimensional data and plane parameters are computed.

Figure 9:
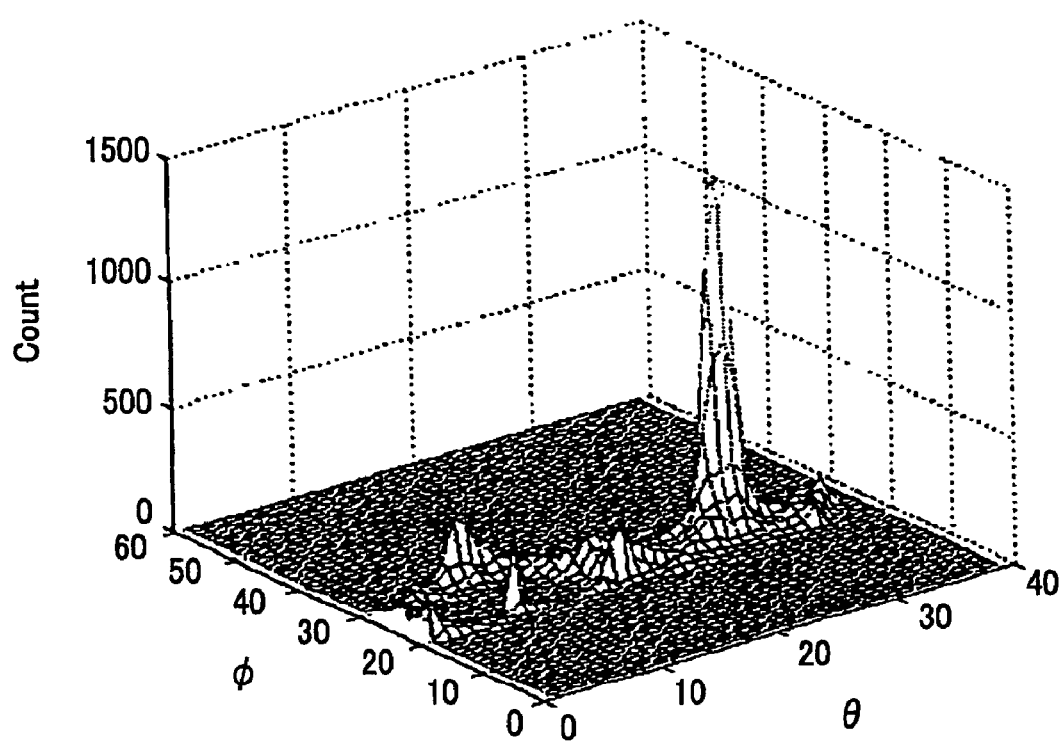
FIG. 9 is a graph illustrating a histogram of a parameter space $(\theta, \phi)$ (polling space) that is used by the robot of FIG. 1 when detecting a plane parameter.

The parameters of a plane can be detected by means of a histogram of a parameter space (θ, φ) (polling space) as shown in FIG. 9. It is safe to assume that an obstacle is there when a parameter gets a poor poll, whereas it is safe to assume that a plane is there when a parameter gets a heavy poll.

Then, an operation of determining the weighted average at and near the peak value is performed (Step S45). The assumed position of the peak can be obtained more accurately as a result of the operation of determining the weighted average. Thus, it is possible to assume the parameters with a level of granularity lower than the quantization size of the representative parameters of each grid.

Then, an operation of iteration is performed using the initial values ($\theta_0$, $\phi_0$, $d_0$) of the assumed parameter values obtained as a result of the operation of determining the weighted average and the three-dimensional coordinates (Step S46) to assume more accurate plane parameters. The iteration is terminated when the variations of the parameters converge as a result of the iteration or when the operation of iteration is repeated by more than a predetermined number of times. Then, the reliability of the result is judged so as to output the finalized plane parameters (θ, φ, d) and the reliability thereof.

When assuming the initial parameter values by way of Hough transformation, it is possible to speed up the processing operation by using three-dimensional data with a low resolution if a multiplexed resolution is obtained for the three-dimensional data by means of a filter bank (FBK) on a real time basis. On the other hand, the accuracy level can be raised by using three-dimensional data with a high resolution at the time of the operation of iteration. In other words, points located sufficiently close to the assumed plane that is obtained by using the initial parameter values are extracted as samples.

As described above, at the time of polling, it is possible to perform an operation of determining the weighted average at and near the peak value and obtain highly reliable data by assumption by weighting the votes differently to differentiate the polled values, selecting an appropriate method of computing the reliability parameters that accompany the three-dimensional data or the plane parameters, and assuming the peak value from the distribution of polling values. Then, it is possible to define a highly reliable plane by conducting an operation of iteration, using the plane parameters as initial parameters for defining a plane. Furthermore, the downstream processing operations can be facilitated by computing the reliability of the plane, using the reliability parameters that accompany the respective three-dimensional data used for computing the ultimately defined plane and the residual errors in the operation of iteration, and outputting the plane reliability along with the data for the plane. Thus, planes are extracted by using a probabilistic method of defining the parameters of a dominant plane that is contained in the three-dimensional data by selecting a probability density function by assumption on the basis of the polling, or the histogram. Then, it is possible to know the distance separating the distance measuring point obtained from the original image and the plane by using the obtained plane parameters. It should be noted that an exemplary method of extracting planes is described above and some other plane extracting method may alternatively be used for the purpose of the invention depending on the accuracy and the performance of the device and other factors.

Figure 10:
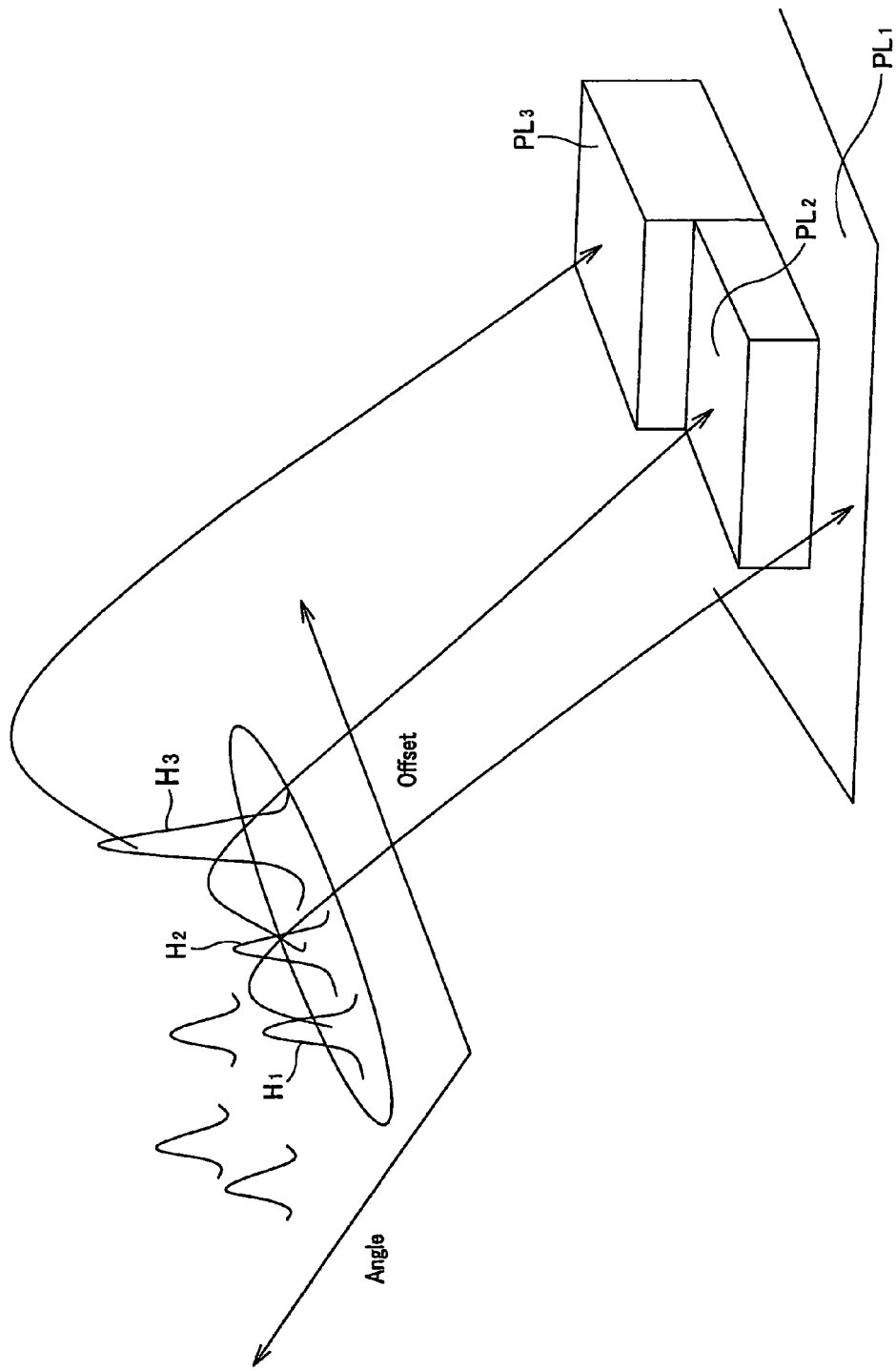
FIG. 10 is a schematic illustration of a histogram formed by using plane parameters $(\theta, \phi)$ detected by the plurality of plane detecting section 401 as a function of angle and offset and the corresponding planes indicated by the detected plane parameters.

As pointed out earlier, the plurality of planes detecting section 401 of this embodiment simultaneously extracts a plurality of planes including the floor surface. FIG. 10 is a schematic illustration of a histogram formed by using plane parameters (θ, φ) detected by the plurality of plane detecting section 401 as a function of angle and offset and the corresponding planes indicated by the detected plane parameters.

Referring to FIG. 10, in the histogram of the plane parameters obtained by polling in a manner as described above, if the floor surface $PL_1$ corresponds to peak $H_1$, it is possible to extract planes $PL_2$, $PL_3$ that run in parallel with the floor surface $PL_1$ and correspond respectively to peaks $H_2$, $H_3$.

Then, the obstacle recognizing section 402, which will be described in greater detail hereinafter, recognizes any part of the image that is higher than the reference plane, which is typically the floor surface, by a predetermined threshold value as an obstacle. However, by extracting a plurality of planes running in parallel with the reference plane, it is possible to recognize any planar region that is higher or lower than the floor surface as some other plane. Additionally, it is possible to prepare an environment map including obstacle information for each plane that is recognized as some other plane. Then, such some other planes may be used as moving route candidates when preparing a moving plan, which will also be described in greater detail hereinafter.

Figure 11:
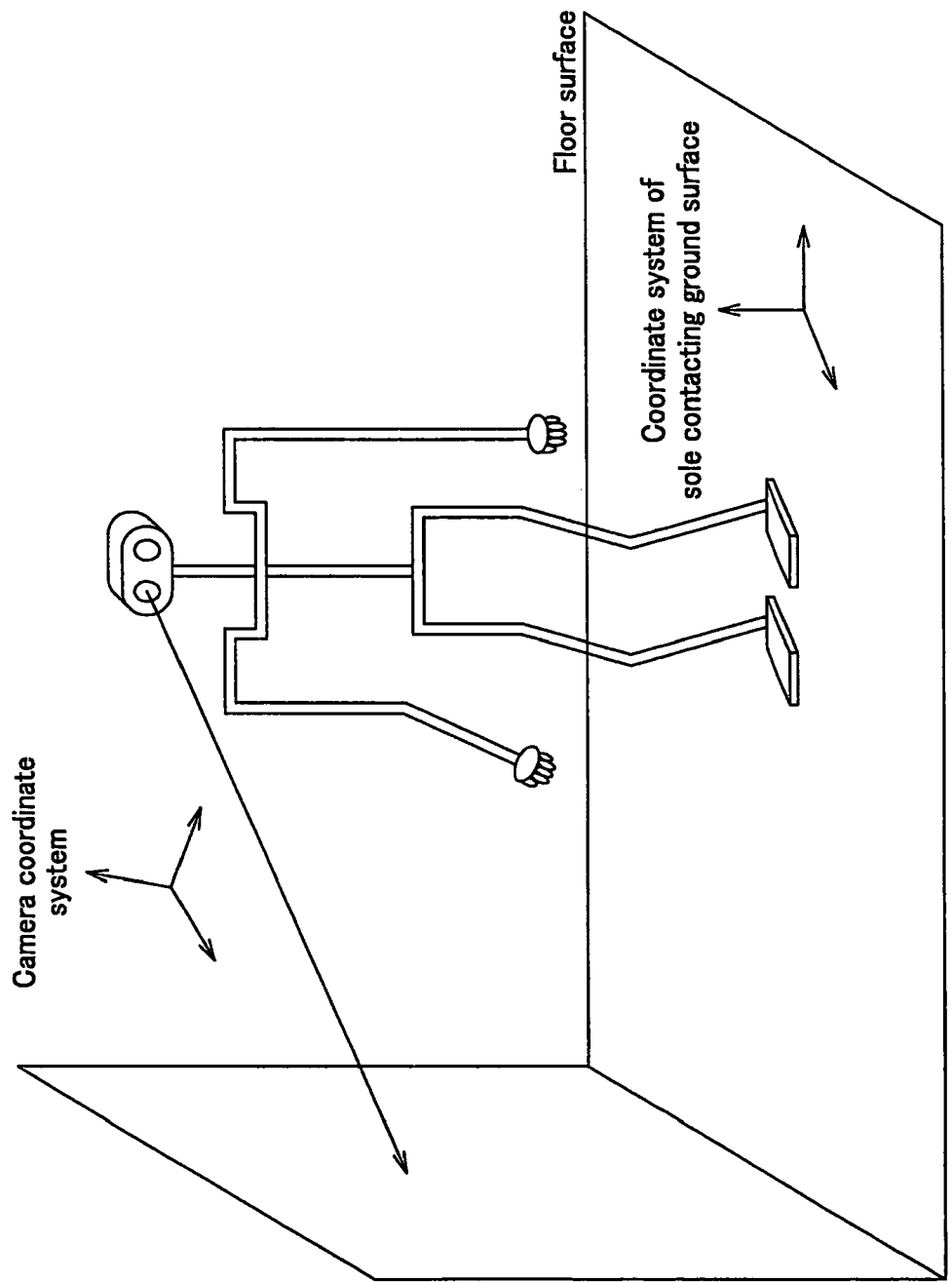
FIG. 11 is a schematic illustration of transformation of the camera coordinate system in the robot into the coordinate system of the sole contacting ground surface of the robot.

Now, returning to FIG. 7, the homogenous transformation matrix of the camera coordinate system is transformed into the coordinate system of the sole contacting ground surface of the robot as shown in FIG. 11 (Step S34). Then, parameters of the contacting ground surface PL that is expressed by the camera coordinate system are computed. Then, as a result of collating the plane detected from the image in Step S33 and the sole contacting ground surface PL detected in Step S34, the floor surface and a plurality of planes running in parallel with it are selected from the plane parameters in the image (Step S35). The robot can move from a region to another region that shows a height difference from the first region by recognizing such a plurality of planes and holding an environment map for each of the planes. In other words, the robot can move up and down on a staircase. The floor surface as detected in Step S35 indicates the plane on which the robot is currently standing or moving.

Then, a point on each of the planes is selected from the original distance image by using the plane parameters selected in Step S35 (Step S36). This operation is performed by using the formulas (1) and (2) below and the fact that the distanced from the corresponding plane is smaller than a threshold value $D_{th}$.

$$d = \frac{|ax + by + c|}{\sqrt{a^2 + b^2}} \quad (1)$$

$$d < D_{th} \quad (2)$$

Figure 12:
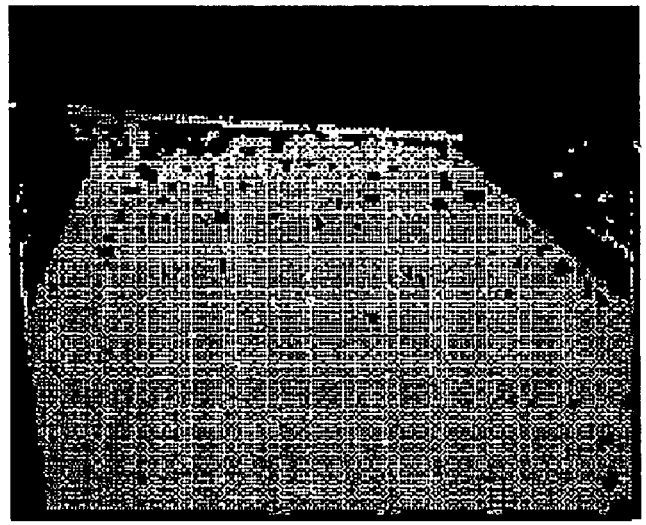
FIG. 12 is a schematic illustration of the measuring points that are selected on a floor surface.

In FIG. 12, the selected measuring points (indicated by x) selected on the floor surface out of the selected group of a plurality of planes when 1 cm is used for the threshold value $D_{th}$. In FIG. 12, the black spots are those that are not judged to be a plane.

Thus, the points that are not on each of the planes selected in Step S36 including the points not on the floor surface are recognized as obstacles in Step S37. Each of those points (x, y) on the floor surface is expressed by the coordinates on the floor surface and the height z. For example, if the height z of such a point is z<0, the point is below the floor surface. Then, the robot may judge that it can pass under an obstacle that is higher than the height of the robot so that such an obstacle is actually not an obstacle.

Figure 13A:
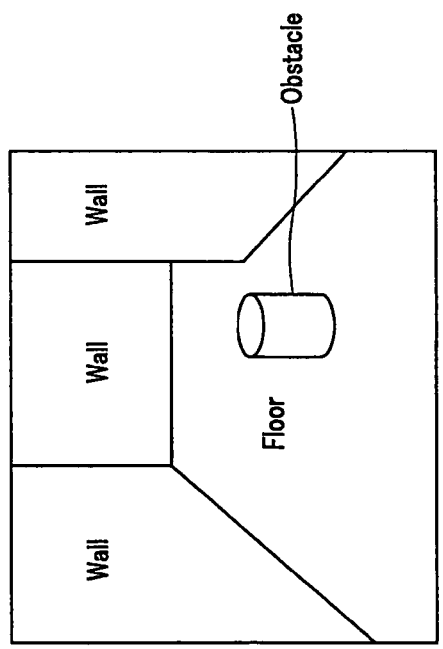
FIG. 13A is a schematic illustration of a robot view observed from the robot of FIG. 1.
Figure 13B:
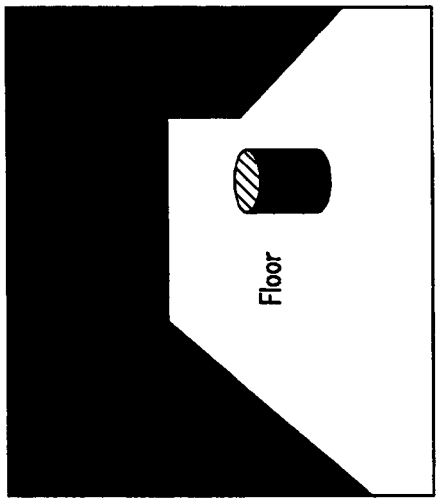
FIG. 13B is a schematic illustration of an image of the floor surface extracted from the robot view.
Figure 13C:
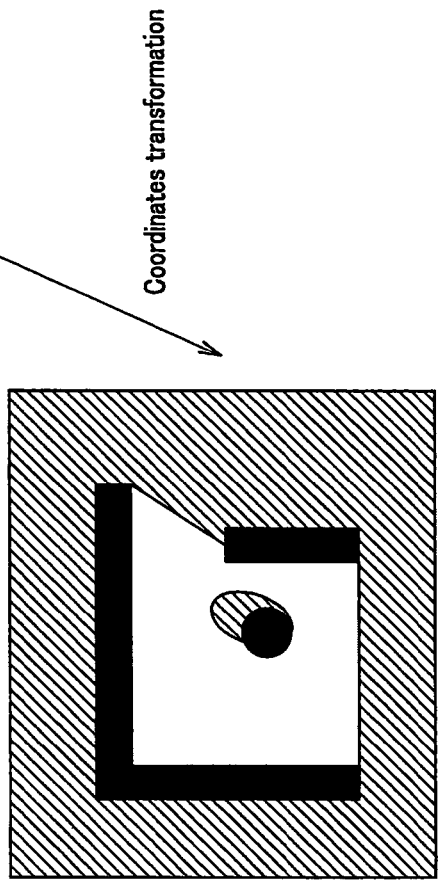
FIG. 13C is a schematic illustration of an obstacle located on a plane (two-dimensional) obtained by transforming the coordinates of FIG. 13B.

FIG. 13A is a robot view and FIG. 13B is an image of the floor surface extracted from the robot view. If the coordinate system is transformed in such a way that the height z in the image of the floor surface is reduced to 0 (z=0), it is possible to express both the floor and an obstacle two-dimensionally as shown in FIG. 13C.

The obstacle recognizing section 402 can extract planes on a stable basis as it extracts planes by means of a plurality of measuring points. Additionally, it can select the right plane as floor surface by collating the plane candidates obtained from the image and the plane parameters obtained from the posture of the robot. Still additionally, it can select a plurality of planes that run in parallel with the floor surface. Therefore, as will be described in greater detail hereinafter, if a plane that runs in parallel with the floor surface, the robot may judge it as a region where it can move. In other words, conventionally a robot detects only a floor surface and hence it judges any region that shows a height difference from the floor surface as an obstacle where it cannot move. To the contrary, if the environment map that shows the plane (floor surface) on which the robot is currently standing as movable range and some other region as unmovable region, the robot of this embodiment can broaden the traveling range by selecting the unmovable region as a moving route candidate where it can move.

The robot, or the obstacle recognizing section thereof, actually recognizes not obstacles but the floor surface and other planes. In other words, it recognizes an obstacle without relying on the shape and the size of the obstacle. Additionally, an obstacle is expressed by the distance from the floor surface so that it can detect fine steps and recesses. Still additionally, it can judge if it can go over or under an obstacle, taking the size of the robot itself into consideration. Furthermore, obstacles are ultimately expressed on a two-dimensional floor surface so that the route planning techniques that are employed in existing robots can be applied to the robot and the operation of planning a route can be carried out at high speed if compared with a case where three-dimensional expressions are used.

The environment map updating section 403 possesses environment maps that contain map information on the robot-centered coordinate system, which is divided to form a grid with meshes of a predetermined size, and attitude information that indicates the angular direction to which the robot turns from a predetermined angular direction on an environment map, which may be the direction of the X-axis or that of the Y-axis. The environment maps corresponds respectively to a reference plane that may be a floor surface and a plurality of planes running in parallel with the floor surface as extracted by the plurality of planes extracting section 401 and typically have a size of 4 m square. In each of the maps, the occupancy ratio of an obstacle is computed from the obstacle information that is input from the obstacle recognizing section 402 for each of the meshes of the grid that have a predetermined size of 4 cm×4 cm, for example.

As the robot 1 moves and hence odometry D7 is input, the environment map updating section 403 updates the environment maps and the attitude information stored in advance in the memory, or the environment maps it recognizes in advance and the information on the orientation of the attitude, as a function of the change in the attitude of the robot (difference angle of movement) and the moving distance (difference amount of movement) of the robot. When each environment map is divided into regions or a predetermined size, it may be so arranged that the environment map is be updated when the difference amount of movement is smaller than the predetermined size of each region but updated when the amount of movement exceeds the predetermined size of each region on the grid. Then, the cost of computations and that of copying the memory can be reduced in the operation of updating the environment maps. The size of the environment maps and the mesh size of the grid to be used for computing obstacle occupancy ratios may be modified appropriately depending on the situation to further reduce the cost of computations and that of copying the memory.

Figure 14:
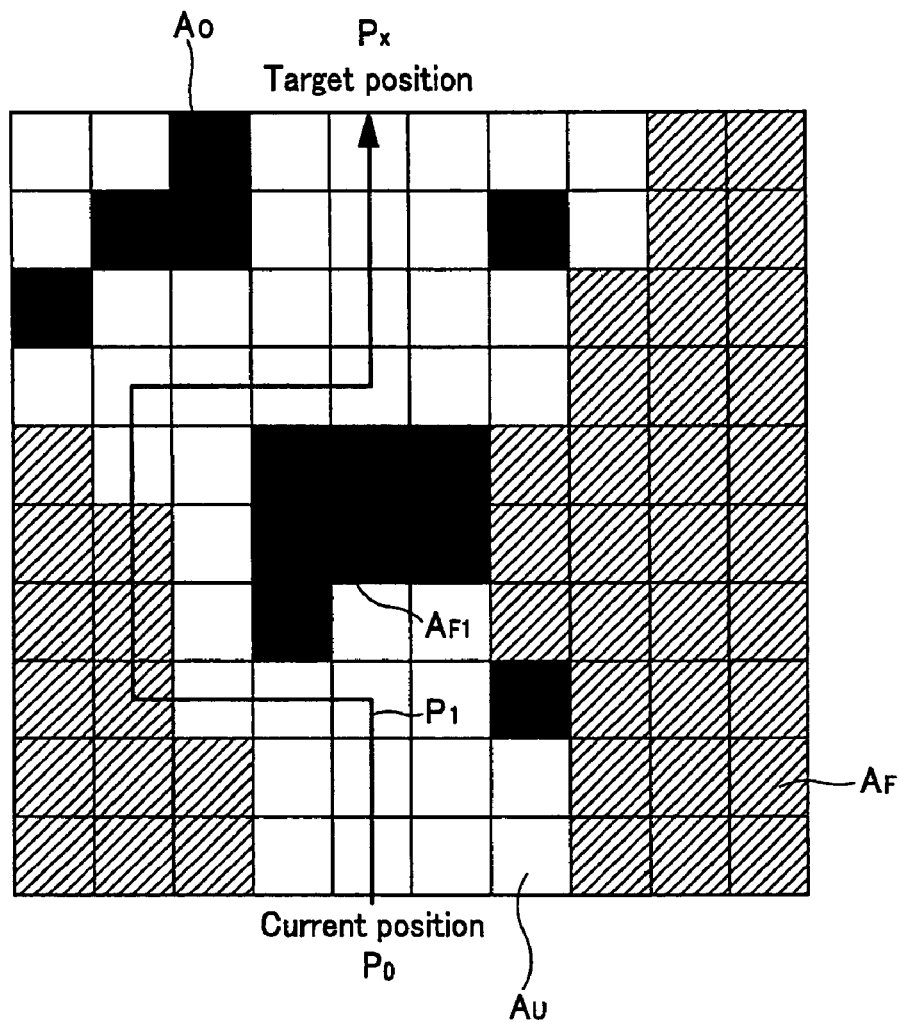
FIG. 14 is a schematic illustration of the route from the current position of the robot to the target position on an environment map generated from obstacle information.

Each point on the environment maps that is generated by the environment map updating section 403 according to the obstacle information supplied from the obstacle recognizing section 402 may be classified into three categories (regions) as shown in FIG. 14 according to the obstacle occupancy ratio of each mesh of the grid.

The first region is a region $A_O$ where an obstacle exists (a region expressed in black in FIG. 14, to be referred to as obstacle region hereinafter). The second region is a region $A_F$ (a region expressed in white in FIG. 14, to be referred to as free space region) in a free space (a space where no obstacle exists). The third region is an unsurveyed region $A_U$ (a shaded region in FIG. 14) in which no survey is conducted to locate an obstacle.

Figure 15A:
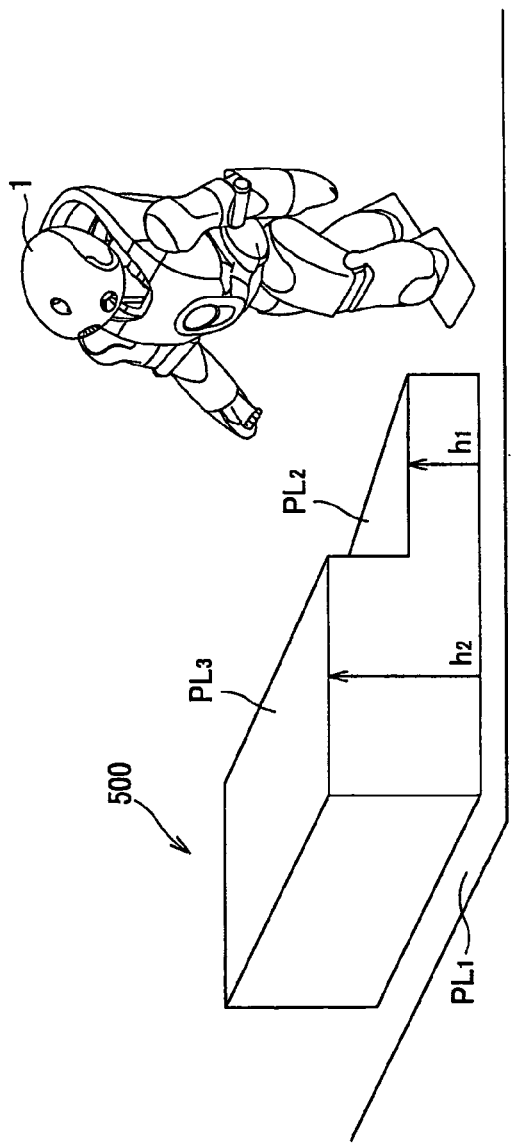
FIG. 15A is a schematic illustration of a robot trying to move up on a staircase and FIG. 15B is a schematic illustration of the environment maps drawn at this time.
Figure 15B:
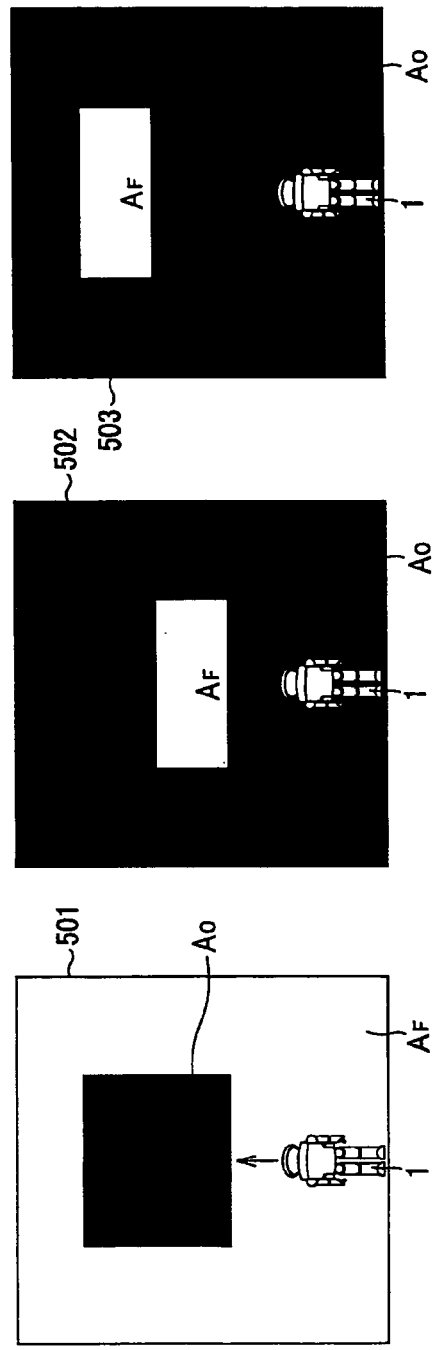

The environment map updating section 403 draws an environment map for each plane or updates the existing environment map according to the information on the obstacle(s) recognized by the environment recognizing section 402. For example, when the robot 1 is located at a position where it can recognize staircase 500 as shown in FIG. 15A, the robot firstly surveys a predetermined direction, which may be the direction of the target of movement. As a result, the plane detecting section 401 can detect floor surface $PL_1$ and step surfaces $PL_2$ and $PL_3$ running in parallel with the floor surface $PL_1$. Then, the obstacle recognizing section 402 acquires information on the obstacles, if any, on these three planes $PL_1$ through $PL_3$ and draws environment maps 501 through 503 respectively for the planes $PL_1$ through $PL_3$ as shown in FIG. 15B or updates the existing environment maps.

In the environment map 501 for the floor surface $PL_1$, the staircase 500 is located at a plane (step surface) higher than the floor surface by height $h_1$ and at another plane (step surface) higher than the floor surface by height $h_2$ so that it is classified as obstacle region $A_O$. In the environment map 502 for the plane $PL_2$, the step surface $PL_3$ is located at a plane higher than the step surface $PL_2$ by height $(h_2-h_1)$ and the floor surface $PL_1$ is located at a plane lower than the step surface $PL_2$ by height $h_1$ so that both of them are classified as obstacle regions $A_O$. Similarly, in the environment map 503 for the step surface $PL_3$, the floor surface $PL_1$ and the step surface $PL_2$ are lower than the step surface $PL_3$ so that both of them are classified as obstacle regions $A_O$.

Then, the route planning section 404 acquires the result of recognition on the obstacles that exist around the robot 1 from the obstacle information coming from the obstacle recognizing section 402. It also acquires the absolute coordinates of the current position of the robot 1 from the absolute coordinates computing section LZ 350 shown in FIG. 2. Then, it generates a route along which the robot can move to the target point that is expressed in terms of the absolute coordinate system or the robot-centered coordinate system without colliding with any obstacle and issues an action command for moving along the route. In short, it determines the actions that the robot 1 has to take in response to the circumstances as recognized from the input data and outputs the action string.

Figure 16:
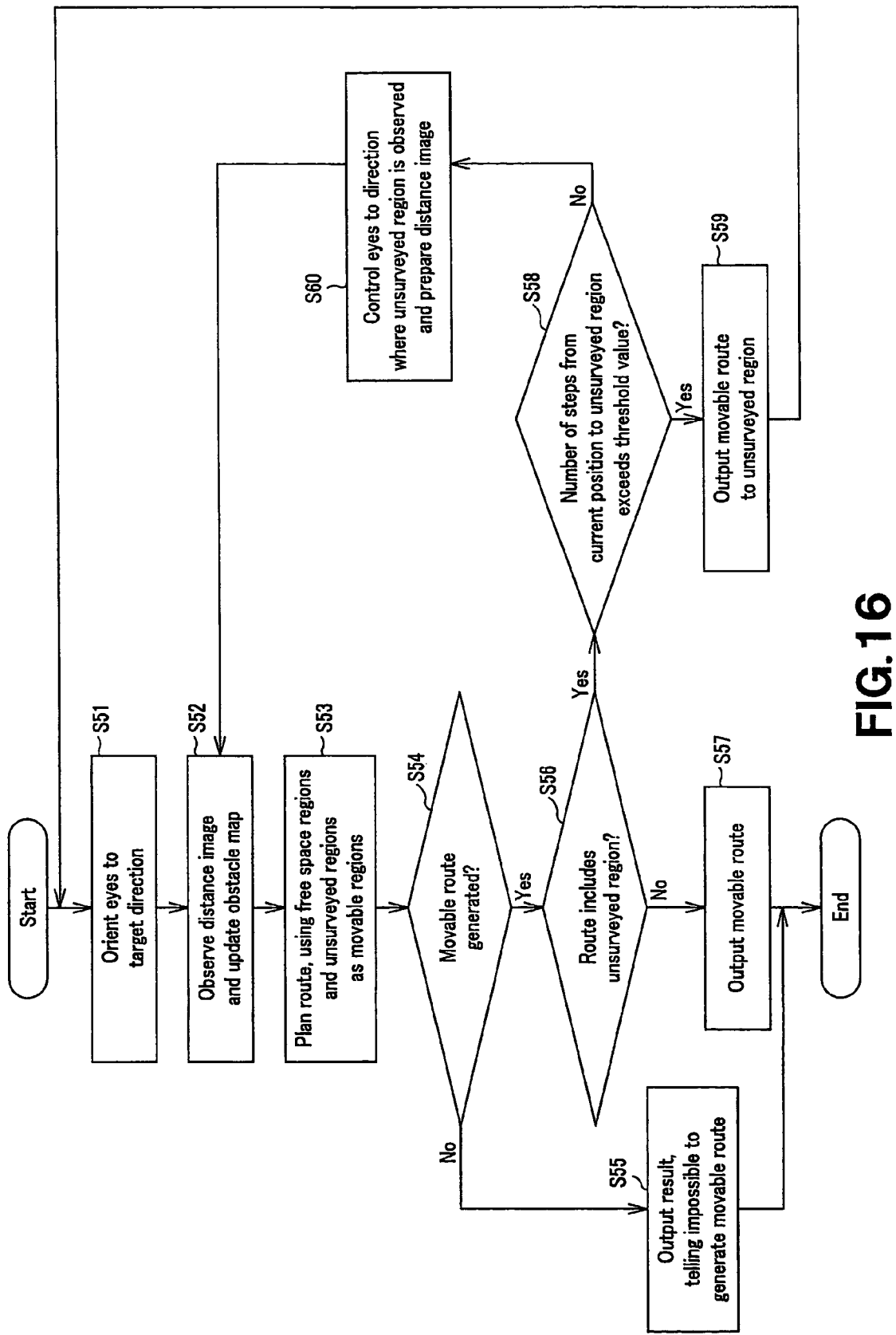
FIG. 16 is a flow chart of the route planning algorithm of the robot of FIG. 15A.

Now, the route planning algorithm that the route planning section 404 uses will be described below by referring to the flow chart of FIG. 16.

First, as shown in FIG. 14, direction of the eyes of the robot orient to the target direction to draw an obstacle map (environment map) that is perimeter around the linear route connecting a current position $P_O$ with a target position $P_X$ (Step S51). Then, it observes a distance image and measures the distance to draw an environment map or update the existing corresponding environment map (Step S52).

Then, it plans a route on the basis of the prepared environment map (Step S53). If the robot only has an environment map for the floor surface, it will plan a route on the assumption that the unsurveyed regions $A_U$ and the free space regions $A_F$ are movable regions. However, the robot of this embodiment detects a plurality of planes and draws an environment map for each of them. Then, the robot holds the most updated environment maps. For example, if the plane on which the robot is currently moving is a floor surface, all the regions higher than the floor surface are classified as obstacle regions $A_O$. However, when the robot proceeds from the current position $P_O$ to a position $P_1$ on the route, it can judge if obstacle region $A_{U1}$ constitutes an obstacle or is detected as some other plane.

Then, if the region is an obstacle region $A_{U1}$ in the environment map for the floor surface but detected as some other plane, the robot refers to the environment map corresponding to the other plane and, if the region $A_{U1}$ is a free space region $A_F$ or an unsurveyed region $A_U$, it regards the region $A_{U1}$ as a movable region. If the robot moves toward the region $A_{O1}$ that is regarded as movable region or follows a route plan that avoids the region depends on the robot itself. More specifically, the robot computes the cost of movement for all the movable regions and can plan a route that minimizes the cost.

Figure 17:
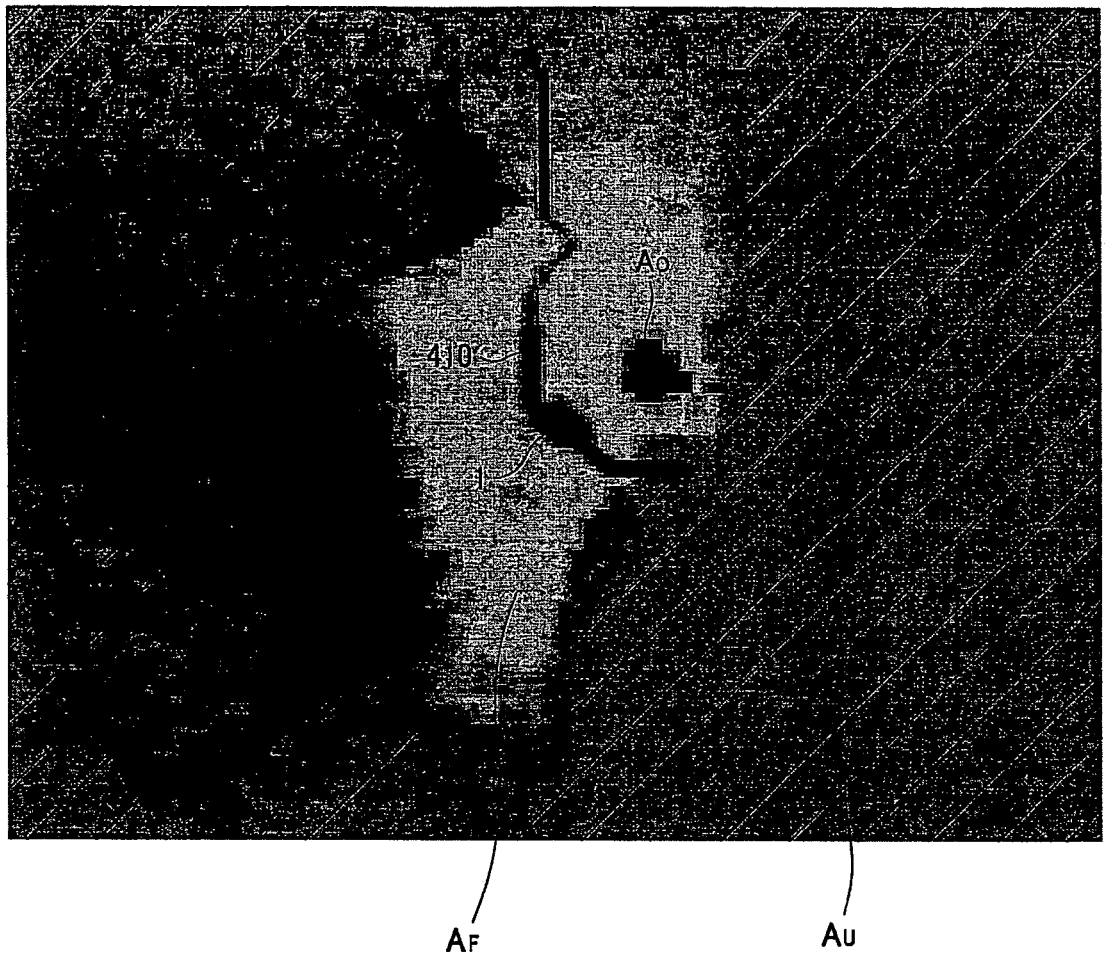
FIG. 17 is an environment map that is actually drawn by the robot of FIG. 15A.
Figure 18:
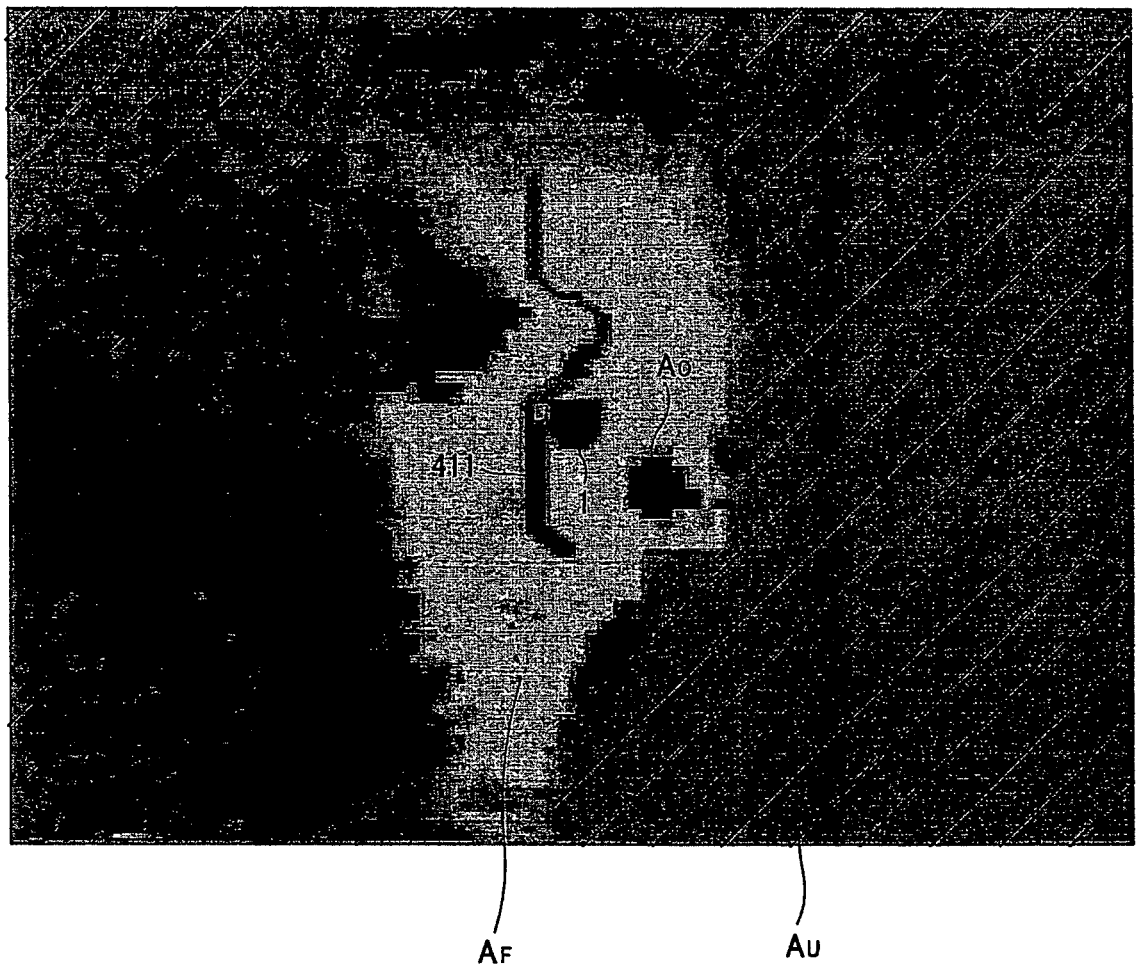
FIG. 18 is another environment map that is actually drawn by the robot of FIG. 15A.
Figure 19:
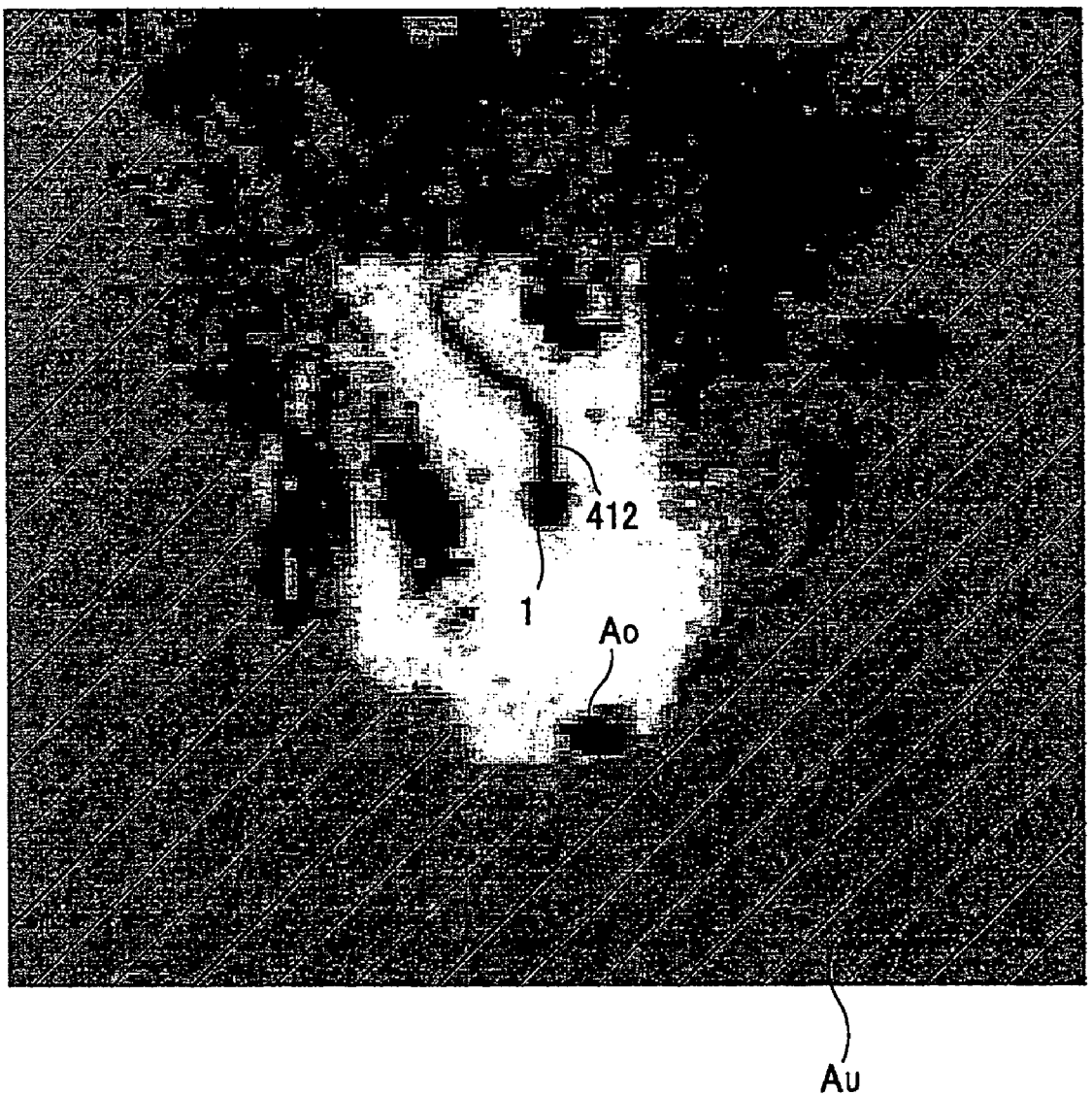
FIG. 19 is a still another environment map that is actually drawn by the robot of FIG. 15A.

FIGS. 17 through 19 illustrates environment maps that are held by the robot 1 in time series. As shown in FIGS. 17 through 19, new obstacle information can be acquired as the robot 1 moves so that the environment maps are updated and a new moving route is defined. As pointed out earlier, each of the environment maps typically covers an area of 2 m square, in which the robot 1 is located at the center and which is divided to form a grid of 100×100 meshes so that the obstacle occupancy ratio of each of the meshes will be computed. The robot 1 can plan a route that may be modified with time as indicated by 410 through 412 in FIGS. 17 through 19 on the basis of the environment maps.

While obstacle regions $A_O$ are indicated by black and free space regions $A_F$ are indicated by white in FIG. 14, the surrounding shaded regions are unsurveyed regions $A_U$ and the other regions are surveyed regions as shown in FIGS. 17 through 19. In other words, the white regions are on a plane and represent so many free space regions $A_F$ where the robot can move freely. The darker a region is, the higher the obstacle occupancy ratio of the region. In short, the gradation shows obstacle occupancy ratios. It may be so arranged that a region is regarded as free space region $A_F$ when it shows a degree of luminance lower than a predetermined level and all the other regions are regarded as obstacle regions $A_O$. Alternatively, it may be so arranged that the moving cost is computed by taking the gradation into consideration.

When planning a moving route, the robot 1 may compute the cost of moving through each of the meshes of the grid in the environment maps that the robot can pass through when moving from the current position and select the meshes of the grid that minimizes the cost.

For the route planning, a technique of A* search may be used to minimize the cost of the entire route. The technique of A* search employs an evaluation function f and is a best-first search technique where the h function is permissive. Optimally efficient points are used for any heuristic functions.

While the robot itself judges each region if it can move through it or not, it is assumed here that optimal parameters are selected so that the robot will not select a free space region $A_F$ that is a plane located at a height greater than a limited value for the robot to move up nor a free space region $A_F$ that is a plane located at a height smaller than a limited value but having an area that is small and on which the robot cannot move. If a region is regarded as a real obstacle region $A_O$ because it is neither a free space region $A_F$ not an unsurveyed region $A_U$ in all the other environment maps, it cannot be a route candidate for the robot because the cost of moving through it will be enormous.

The route generated in Step S53 typically by applying the technique of A* search is checked in Step S54 to see if the robot can really follow the route. Then, if it is not a route that the robot can follow to avoid obstacles (NO), the route planning section 404 so judges that it is impossible to plan a movable route if it continues surveying and terminates the route planning operation, telling the robot so (Step S55).

If it is possible to plan a movable route by applying the technique of A* search in Step S53 (YES), the processing operation proceeds to Step S56, where it is checked if the any unsurveyed region is found on the output route or not. If no unsurveyed region is found on the route in Step S56 (NO), the movable route to the target position is output as planned route in Step S57. If, on the other hand, an unsurveyed region is found on the route in Step S56 (YES), the processing operation proceeds to Step S58, where the number of steps from the current position to the unsurveyed region is computed and it is checked if the computed number of steps exceeds a predetermined threshold value.

If it is found in Step S58 that the number of steps exceeds the threshold value (YES), the processing operation proceeds to Step S59 to output the movable route to the unsurveyed region and returns to Step S51. If, on the other hand, it is found in Step S58 that the number of steps to the unsurveyed region does not exceed the threshold value (NO), the unsurveyed region is surveyed by controlling the direction of the eyes of the robot so as to measure the distance to it (Step S60) and the obstacle maps are updated.

When there are planes running in parallel with the floor surface, the route planning section 404 that employs the above described route planning algorithm can judge if each and every region on the environment map for the floor surface is a movable region for the robot or not even when it is neither an unsurveyed region $A_U$ nor a free space region $A_F$ but an obstacle region $A_O$. Thus, the robot can remarkably broaden the scope of movable routes if compared with a case where it only have an environment map for the floor surface. Additionally, when it is so arranged that the robot only surveys the unsurveyed regions $A_U$ that are found on the output route, it is possible to generate a moving route plan efficiently in a short period of time because it is not necessary to perform survey operation and distance image computing operations that are unnecessary for moving to the target position.

While a reference plane such as a floor surface is extracted first and then a plurality of planes running substantially in parallel with the reference plane are extracted in the above description, it may alternatively be so arranged that inclined planes such as sloped roads are also extracted if the inclinations thereof relative to the reference plane are small and the robot can move on them. Then, obstacle information can be acquired for them so that environment maps may be prepared and updated by taking them into consideration.

Figure 20:
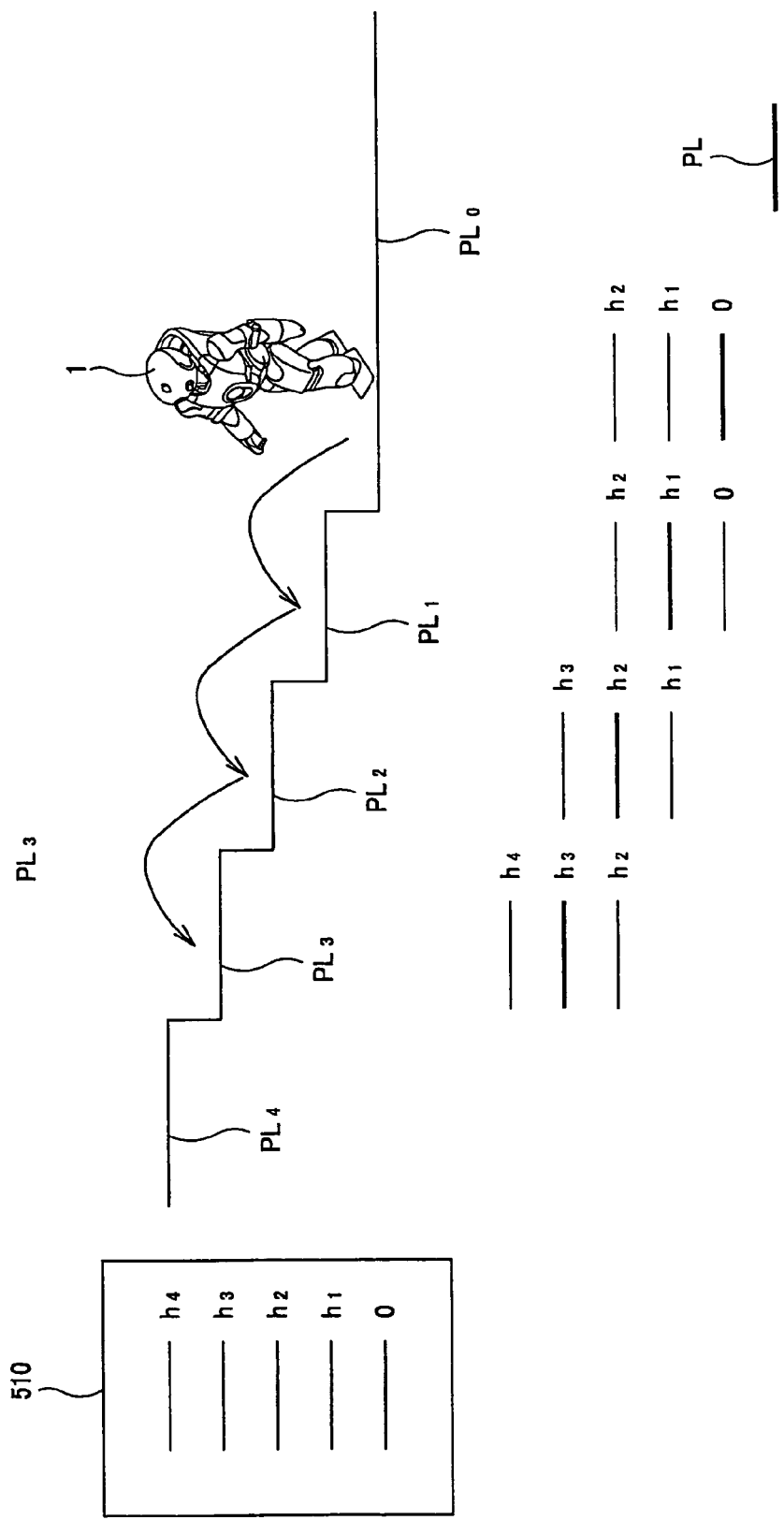
FIG. 20 is a schematic illustration of a robot trying to move up on a staircase.
Figure 21:
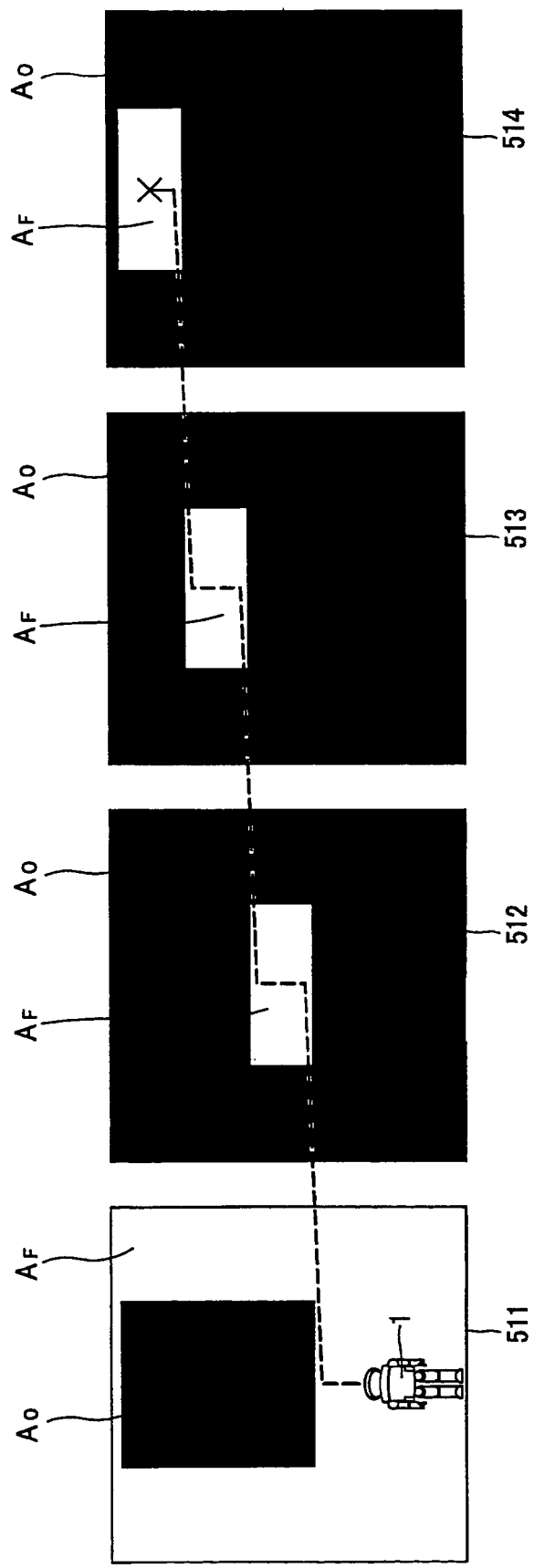
FIG. 21 is a schematic illustration of the environment maps drawn by the robot of FIG. 20 trying to move up on a staircase.

Now, a two-footed traveling type robot that is adapted to move up and down on staircases on the basis of the cost computed in a manner as described above will be described below. FIG. 20 is a schematic illustration of such a robot moving up on a staircase and FIG. 21 shows environment maps for the robot moving up the staircase shown in FIG. 20. In the following description, the plane on which the robot is currently moving (the plane on which at least one of the feet of the robot is placed at present: on foot plane) is selected as reference plane PL. Assume that step planes $PL_1$ through $PL_4$ are formed above the floor surface $PL_0$ at respective heights of $h_1$ through $h_4$ ($0<h_1<h_2<h_3<h_4$).

Also assume that the robot 1 is currently on the reference plane $PL=PL_0$ and going to move up from the floor plane $PL_0$ by way of the step planes $PL_1$ through $PL_3$. Firstly, the plane detecting section 401 of the robot 1 observes the surroundings from the floor surface $PL_0$ and detects the floor surface $PL_0$. Then, if there are planes running in parallel with the floor surface $PL_0$, it detects them. At this time, while the floor detecting section 401 may extract all the planes found within the scope of recognition and running in parallel with the floor surface $PL_0$, it may alternatively be so arranged that the floor detecting section 401 extracts two of them that respectively show the smallest and the second smallest heights from the floor surface $PL_0$ in order to limit the number of environment maps that the robot needs to store because the memory capacity of the robot is limited. In the case of FIG. 20, the floor detecting section 401 detects the step planes $PL_1$, $PL_2$ having respective heights of $h_1$, $h_2$ as observed from the floor surface $PL_0$. As a result, the volume of the arithmetic operation can be reduced. Additionally, planes that run in parallel with the floor surface $PL_0$ but whose heights are too large for the robot to climb will not be extracted.

Then, the obstacle recognizing section 402 recognizes obstacles, if any, on the extracted planes $PL_0$ through $PL_2$ and the grid occupancy ratios of the obstacles on each of the planes are computed on the basis of the obstacle information recognized by the environment map updating section 403. Then, environment maps are drawn for the planes $PL_0$ through $PL_2$ as shown in FIG. 14. More specifically, environment maps 511 through 513 as shown in FIG. 21 are drawn.

Then, the robot 1 is moving on the floor surface $PL_0$, firstly a route plan is prepared on the basis of the environment map 511 for the floor surface $PL_0$ as shown in FIG. 21. While the step plane $PL_1$ and other step planes showing a height difference relative to the floor surface $PL_0$ are classified as obstacle regions $A_O$ in the environment map 511, the obstacle regions $A_O$ in the environment map 511 is partly the plane $PL_1$ in the environment map 512 for the step plane $PL_1$ and hence regarded as free space regions $A_F$. The robot 1 judges if it can move onto the step plane $PL_1$ that is regarded as obstacle regions $A_O$ in the environment map 511 by referring to the environment map 512 for the step plane $PL_1$ that is detected as some other plane. Then, as described above, the robot 1 computes the cost of moving up from the region (grid) where it is currently located to a neighboring region (grid). If only the environment map for the floor surface $PL_0$ is used, the regions that are regarded as free space regions $A_F$ in the environment map 512 are regarded as obstacle regions $A_O$ so that the cost of moving to those regions will be extremely high and hence the robot 1 will judge that it cannot move up there. However, as environment maps are three-dimensionally held, the cost of moving to those regions is reduced and they can provide a moving route candidate.

If it is judged that the robot 1 can move up to the step plane $PL_1$, information on the height $h_1$ of the step plane $PL_1$ from the floor surface $PL_0$ is received from the obstacle recognizing section 402 and it is determined from the environment map 512 if the step plane $PL_1$ has a surface area that is sufficiently large for the robot 1 to move there. Then, the robot 1 determines if it can actually move up to the step plane $PL_1$ or not on the basis of these pieces of information. While the step planes $PL_1$, $PL_2$ that are higher than the floor surface $PL_0$ are extracted in the above description, it may alternatively be so arranged that the robot 1 also extracts planes lower than the reference plane PL and computes the cost of moving up and moving down. The cost of moving per unit distance when moving from a plane to another plane may be differentiated from the cost of moving per unit distance when moving on a same plane. When an obstacle region $A_O$ in the environment map 511 for the reference plane PL is also an obstacle region $A_O$ in the environment map for some other plane, a high cost will be defined for moving on such a region so that the robot will judge it is impossible to move there as in the case where the robot holds only a single environment map.

If the robot 1 judges that it can move to the step plane $PL_1$ and selects the step plane $PL_1$ for the moving route, it actually moves to the step plane $PL_1$. As the robot 1 moves up on the staircase, the reference plane on which at least one of the feet of the robot 1 is found is shifted to the step plane $PL_1$. On the step plane $PL_1$, the robot 1 once again extracts a reference plane PL and two planes whose heights are small relative to the reference plane PL.

When reference plane PL=step plane $PL_1$, the step plane $PL_1$, the floor surface $PL_0$ and the step plane $PL_2$ are extracted so that the environment maps drawn on the floor surface $PL_0$ can be used. However, if one or more than one new obstacles are found, the environment maps 511 through 513 will be updated.

Thus, the robot 1 can climb up the staircase step by step from the step plane $PL_1$ by repeating the above described processing operation to get to the step plane $PL_4$. While two planes (step planes) whose heights are relatively small as viewed from the reference plane that the robot 1 judges to be movable thereon are selected in the above description, the two planes to be selected by the robot 1 may change each time when the robot 1 moves up onto or down from a step. In other words, each time the reference plane changes, the robot extracts different other planes. This will be referred to as plane tracking in the following description.

Thus, the environment map updating section 403 of the robot 1 that climbs to the step plane $PL_3$ generates a group of environment maps 510 for the planes from the floor surface $PL_0$ to the step plane $PL_4$ as shown in FIG. 20. While the robot extracts a reference plane and other two planes whose heights are relatively small as viewed from the reference plane and prepares environment maps for them in this example, it may alternatively be so arranged that, when more than two planes to which the robot 1 can move are detected, they are extracted and environment maps are prepared for them.

As environment maps are held three-dimensionally, it is possible to compute not only the cost of moving on a same plane but also the cost of moving from a plane to another plane so that the least costly route to the target position can be selected by using the estimated costs.

Figures 22A, 22B:
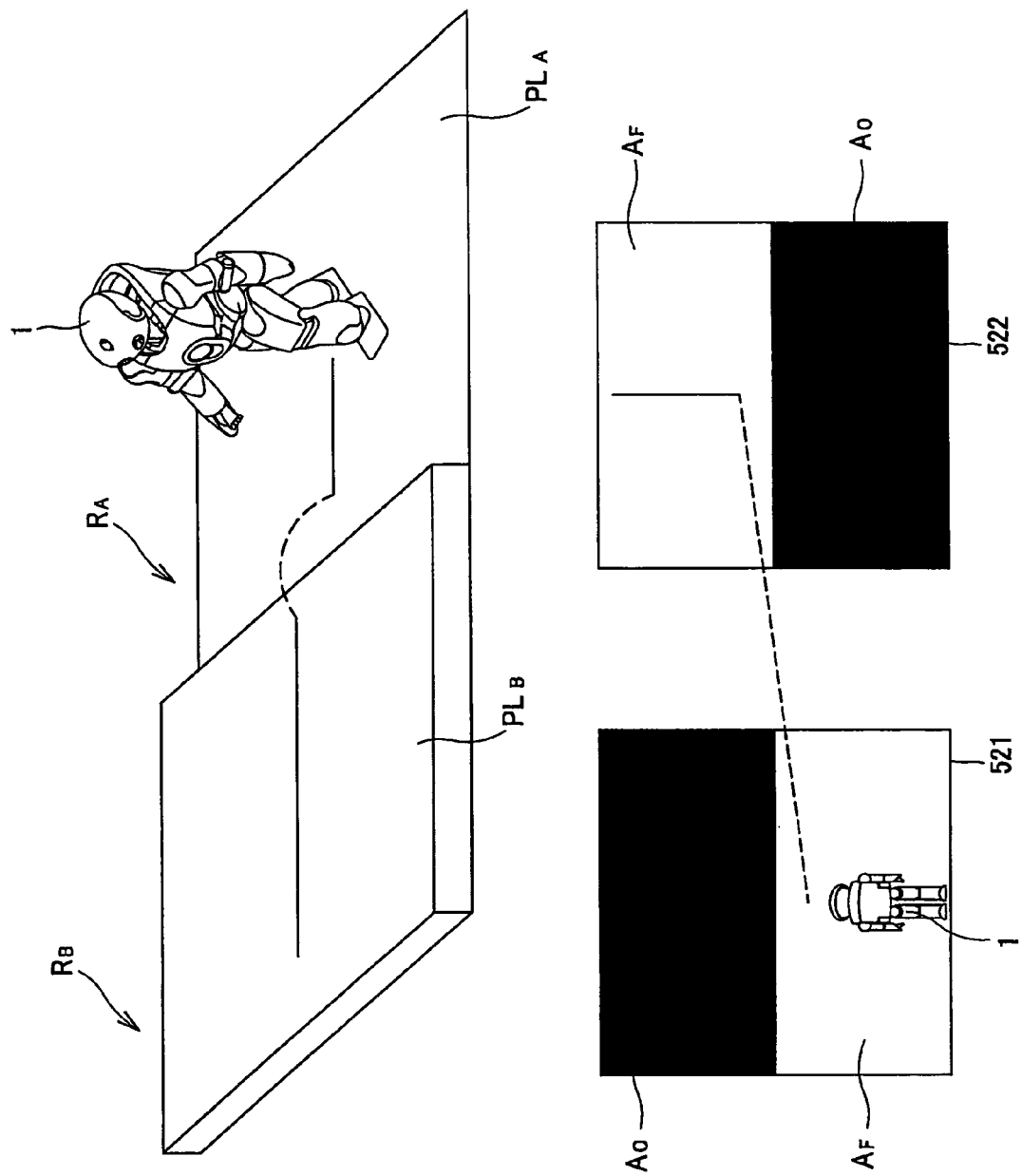
FIGS. 22A and 22B are schematic illustrations of an example where the robot is trying to move from a plane to another plane.

Now, another example where the robot 1 moves from a plane to another plane will be described below. FIGS. 22A and 22B schematically illustrate another example where the robot moves from a plane to another plane. FIG. 22A shows the robot moving from a room into another room by way of a step and FIG. 22B shows environment maps of the respective rooms. In this example, it is assumed that room $R_A$ is directly connected to room $R_B$ and floor surface $PL_B$ of the room $R_B$ is higher than the floor surface $PL_A$ of the room $R_A$.

When the robot 1 is moving in the room $R_A$, the floor surface $PL_A$ of the room $R_A$ is selected as current reference plane and an environment map 521 as shown in FIG. 22B is drawn. Since the floor surface $PL_B$ of the room $R_B$ is higher than the floor surface $PL_A$ of the room $R_A$, it is regarded as obstacle region $A_O$. Then, as the room $R_B$ comes into the observable area of the robot 1, the floor surface $PL_B$ of the room $R_B$ is extracted because it is in parallel with the floor surface $PL_A$ of the room $R_A$ and an environment map 522 is drawn for it.

As the environment map 522 is drawn for the floor surface $PL_B$ of the room $R_B$, the floor surface $PL_B$ that is regarded as obstacle regions $A_O$ in the environment map 521 for the floor surface $PL_A$ and for which high cost is computed is now regarded as free space regions $A_F$ where the robot 1 can move in the environment map 522. Then, the cost of moving there is reduced a new route of moving into the room $R_B$ is generated.

In this way, while the robot 1 may be unable to move only in the room $R_A$ when it has only an environment map 521, it can autonomously move from the floor surface $PL_A$ to the floor surface $PL_B$ to broaden the area where the robot 1 can move because the floor surface $PL_B$ that runs in parallel with the floor surface $PL_A$ is automatically recognized and an environment map 522 is drawn.

Now, a two-footed traveling type robot that is adapted to extract a plurality of planes in the environment, three-dimensionally recognize the environment and perform an operation of plane tracking to follow a route plan will be described below in detail. The man-like robot is a pragmatic robot that can support activities of people in various scenes of daily life in a living environment or some other environment. It is an entertainment robot that can not only behave, responding to its internal state (anger, sadness, joy, pleasure, etc.) but also produce basic actions of man.

Figure 23:
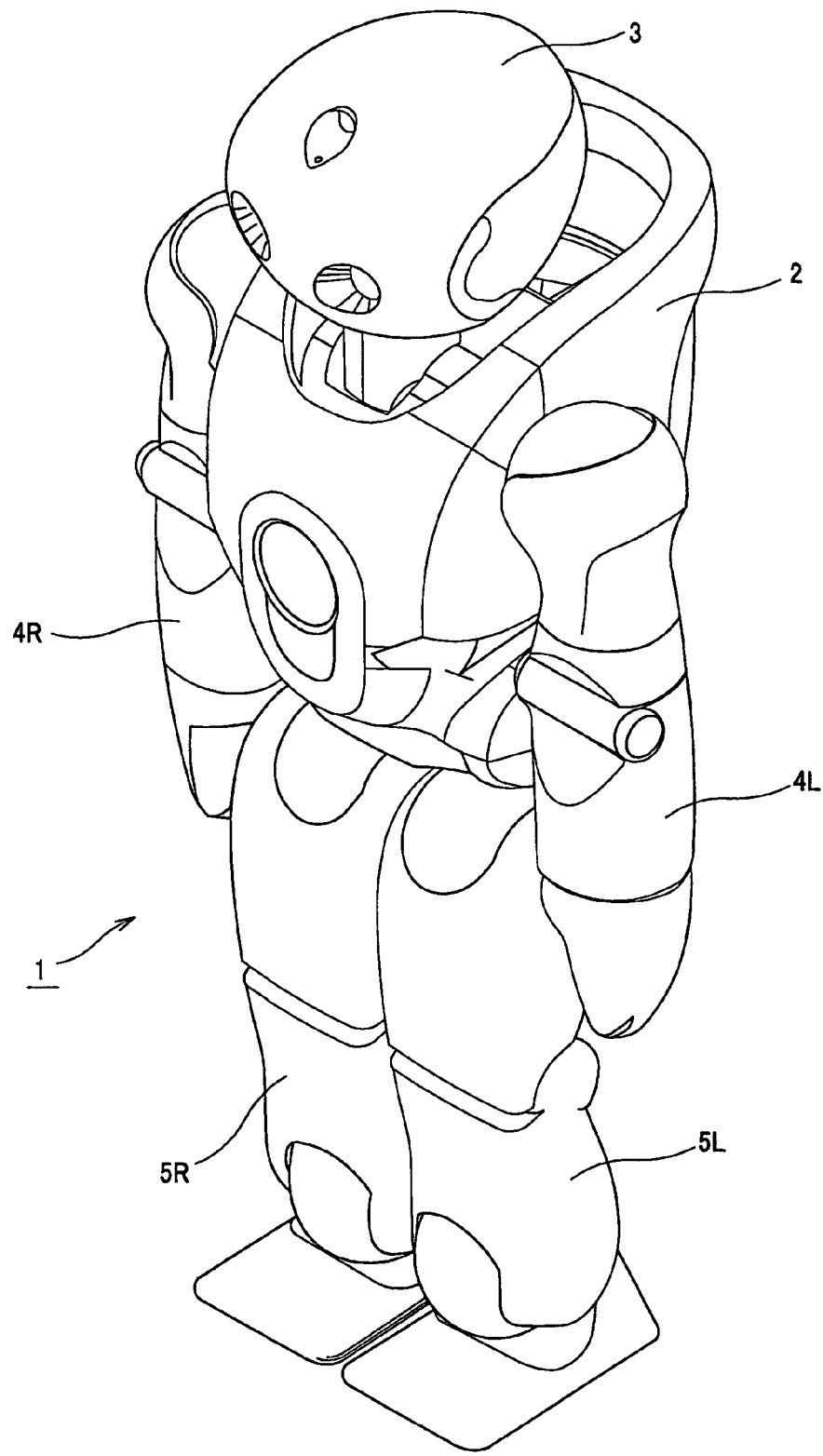
FIG. 23 is a schematic perspective view of the robot of this embodiment.

Referring to FIG. 23, the robot 1 comprises a trunk unit 2 to which a head unit 3 is linked at a predetermined position. At the same time, a pair of arm units 4R/L and a pair of leg units 5R/L are linked at the left and right sides (R and L are prefixes indicating respective right and left).

Figure 24:
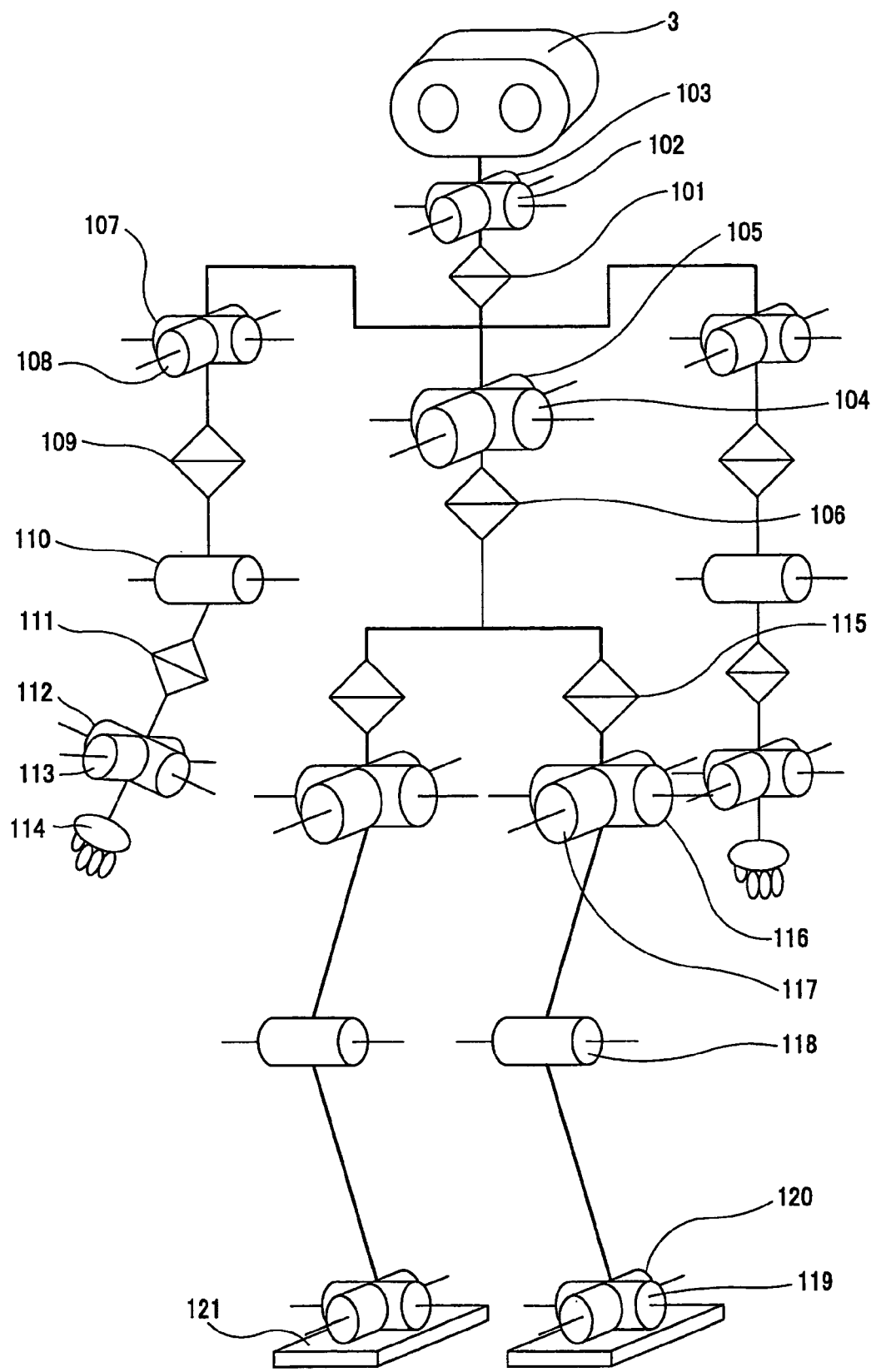
FIG. 24 is a schematic illustration of the degrees of freedom of each of the joints of the robot.

FIG. 24 schematically illustrates the degrees of freedom of each of the joints of the robot 1. The neck joint supporting the head unit 3 has three degrees of freedom realized by a neck joint yaw axis 101, a neck joint pitch axis 102 and a neck joint roll axis 103.

Each of the arm units 4R/L has a shoulder joint pitch axis 107, a shoulder joint roll axis 108, an upper arm yaw axis 109, an elbow joint pitch axis 110, a forearm yaw axis 111, a wrist joint pitch axis 112, a wrist joint roll axis 113 and a hand section 114. The hand section 114 is in fact a multi-joint/multi-degree of freedom structure and includes a plurality of fingers. However, since the actions of the hand sections 114 participate and influence the attitude control and the walk control of the robot 1 only to a small extent, the degree of freedom of the hand sections 114 are assumed to be nil in this specification. Therefore, each of the arm units has seven degrees of freedom.

The trunk unit 2 has three degrees of freedom realized by a trunk pitch axis 104, a trunk roll axis 105 and a trunk yaw axis 106.

Each of the leg units 5R/L has a hip joint yaw axis 115, a hip joint pitch axis 116, a hip joint roll axis 117, a knee joint pitch axis 118, an ankle joint pitch axis 119, an ankle joint roll axis 120 and a foot section 121. In this specification, the intersection of the hip joint pitch axis 116 and the hip joint roll axis 117 defines the position of the hip joint of the robot 1. While the foot section 121 is in fact a structure including a sole that has a multi-joint/multi-degree of freedom, the soles of the robot 1 are defined to have a degree of freedom that is equal to nil. Therefore, each of the leg units has six degrees of freedom.

To summarize, the entire robot 1 has a total of 3+7×2+3+6×2=32 degrees of freedom. However, the degrees of freedom of the entertainment robot 1 are not limited to 32. The number of degrees of freedom and hence the number of joints may be increased or decreased depending on the requirements that need to be met for designing and preparing the robot including those defined in the specification.

As pointed out above, each degree of freedom of the robot 1 is realized by means of an actuator. The actuators of the robot are preferably small and lightweight from the necessity of making the robot appear like a living human without unnatural swells and that of controlling the attitude of the unstable structure that moves on two feet.

Figure 25:
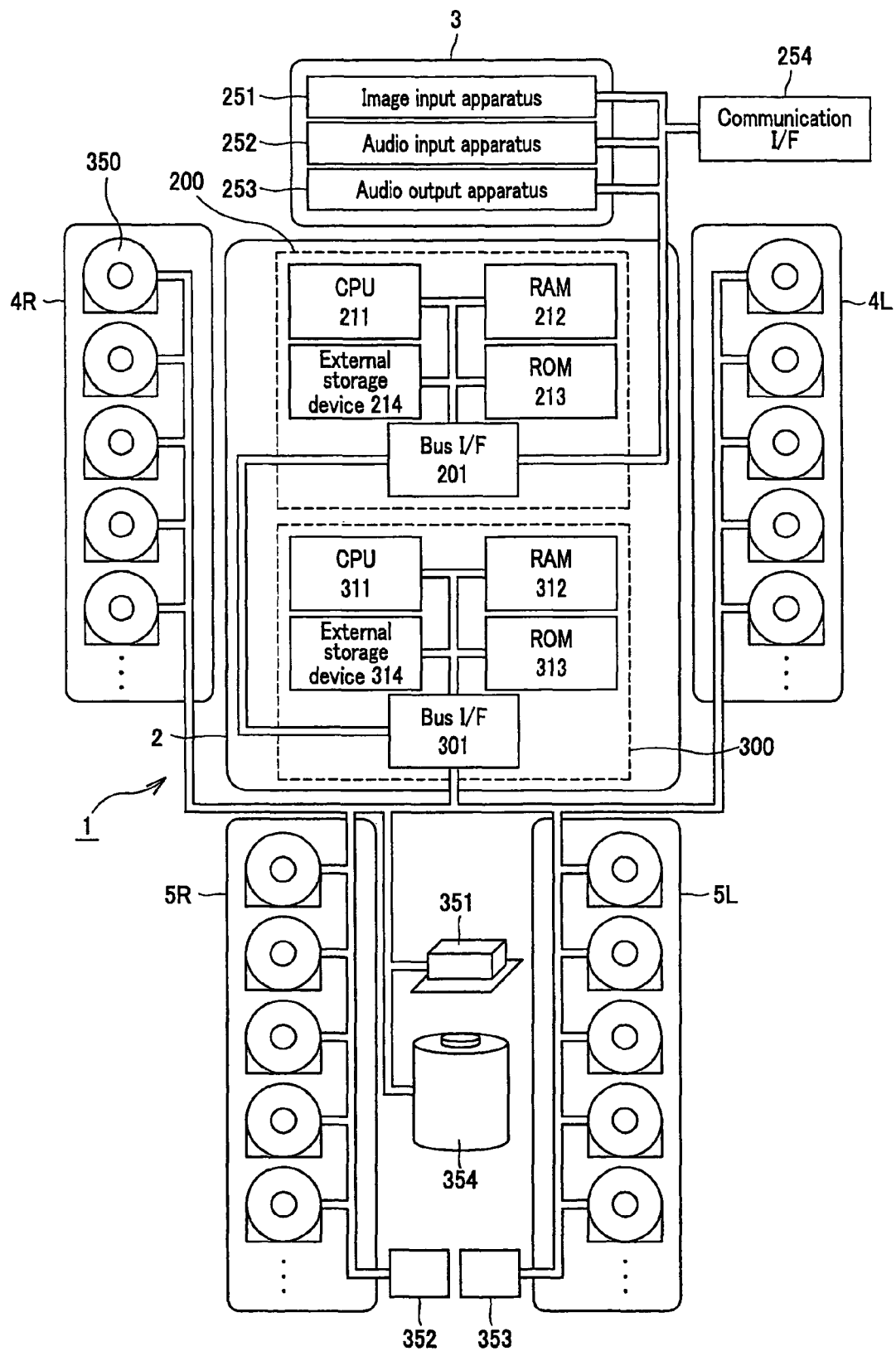
FIG. 25 is a schematic illustration of the control system of the robot, showing the system configuration.

FIG. 25 schematically illustrates the configuration of the control system of the robot 1. Referring to FIG. 25, the robot 1 comprises a trunk unit 2, a head unit 3, a pair of arm units 4R/L and a pair of leg units 5R/L that make the robot 1 resemble the human body along with a control unit 10 for controlling the adaptability of the units and coordinating the actions of the units so as to make the robot 1 behave smoothly in a natural manner.

The entire action of the robot 1 is comprehensively controlled by the control unit 10. The control unit 10 comprises a main control section 11 that includes a CPU (central processing unit), a DRAM, a flash ROM and other major circuit components (not shown) and a peripheral circuit section 12 that includes interfaces (not shown) for exchanging data and commands among the power supply circuit and the components of the robot 1.

When embodying the present invention, the position where the control unit 10 is installed is not subjected to any particular limitations. More specifically, while it is mounted in the trunk unit 2 in FIG. 25, it may alternatively be mounted in the head unit 3. Still alternatively, the control unit 10 may be arranged outside the robot 1 so as to communicate with the robot 1 by way of a wired or wireless communication line.

The degrees of freedom of each of the joints of the robot 1 shown in FIG. 24 are realized by the corresponding actuators. More specifically, the neck joint yaw axis 101, the neck joint pitch axis 102 and the neck joint roll axis 103 of the head unit 3 are provided respectively with a neck joint yaw axis actuator $A_2$, a neck joint pitch axis actuator $A_3$ and a neck joint roll axis actuator $A_4$.

Additionally, CCD (charge coupled device) cameras for picking up external images of the surroundings are arranged in the head unit 3 along with a distance sensor for gauging the distance from the robot to an object located in front of the robot, a microphone for gathering eternal sounds, a speaker for outputting sounds and touch sensors for detecting the pressure applied by a physical action such as "stroking" or "hitting" that is exerted by the user.

The trunk pitch axis 104, the trunk roll axis 105, the trunk yaw axis 106 of the trunk unit 2 are provided respectively with a trunk pitch axis actuator $A_5$, a trunk roll axis actuator $A_6$ and a trunk yaw axis actuator $A_7$. The trunk unit 2 is additionally provided with a battery that operates as power source for driving the robot 1 to move. The battery is formed by dischargeable/rechargeable cells.

The arm units 4R/L are divided respectively into upper arm units $4_1$R/L, elbow joint units $4_2$R/L and forearm units $4_3$R/L. In each of the arm units 4R/L, the shoulder joint pitch axis 107, the shoulder joint roll axis 108, the upper arm yaw axis 109, the elbow joint pitch axis 110, the forearm yaw axis 111, the wrist joint pitch axis 112 and the wrist joint roll axis 113 are respectively provided with a shoulder joint pitch axis actuator $A_8$, a shoulder joint roll axis actuator $A_9$, an upper arm yaw axis actuator $A_{10}$, an elbow joint pitch axis actuator $A_{11}$, an elbow joint roll axis actuator $A_{12}$, a wrist joint pitch axis actuator $A_{13}$ and a wrist joint roll as actuator $A_{14}$.

The leg units 5R/L are divided respectively into thigh units $5_1$R/L, knee units $5_2$R/L and shank units $5_3$R/L. In each of the leg units 5R/L, the hip joint yaw axis 115, the hip joint pitch axis 116, the hip joint roll axis 117, the knee joint pitch axis 118, the ankle joint pitch axis 119 and the ankle joint roll axis 120 are respectively provided with a hip joint yaw axis actuator $A_{16}$, a hip joint pitch axis actuator $A_{17}$, a hip joint roll axis actuator $A_{18}$, a knee joint pitch axis actuator $A_{19}$, an ankle joint pitch axis actuator $A_{20}$ and an ankle joint roll axis actuator $A_{21}$. Preferably, each of the actuators $A_2, A_3 \ldots$ that are used for the joints is realized as a small AC servo actuator that is directly driven by a gear and whose servo control system is realized as a single chip and mounted in the motor unit of the actuator.

The actuator drive control sections of the trunk unit 2, the head unit 3, the arm units 4R/L and the leg units 5R/L are provided respectively with auxiliary control sections 20, 21, 22R/L, 23R/L. Additionally, the leg units 5R/L are provided respectively with grounding confirming sensors 30R/L for detecting if the sole of either of the feet of the robot is or both of the soles of the of the robot are grounded or not. Still additionally, an attitude sensor 31 for sensing the attitude of the robot is arranged in the trunk unit 2.

Each of the grounding confirming sensors 30R/L comprises a proximity sensor or a micro-switch arranged on the sole. The attitude sensor 31 is formed by combining an acceleration sensor and a gyro sensor.

It is possible to determine if each of the left and right legs is currently standing on the ground or suspended in the air during a walking or running action of the robot on the basis of the output of the grounding confirming sensors 30R/L. Additionally, it is possible to detect the inclination and the posture of the trunk section of the robot on the basis of the output of the attitude sensor 31.

The main control section 11 can dynamically modify the attitude of the object of control according to the outputs of the sensors 30R/L, 31. More specifically, the main control section 11 adaptively controls each of the auxiliary control sections 20, 21, 22R/L, 23R/L to realize a general movement pattern for driving the arms, the trunk and the legs of the robot 1 in a coordinated manner.

A general movement of the robot 1 is realized by defining a movement of each of the legs, an ZMP (zero moment point) trajectory, a movement of the trunk, a movement of each of the arms and the height of the waist, while transferring the commands for instructing movements conforming to the respective definitions to the auxiliary control sections 20, 21, 22R/L, 23R/L. Then, the auxiliary control sections 20, 21, . . . interpret the commands received from the main control section 11 and output drive control signals respectively to the actuators $A_2, A_3 \ldots$. The expression of "ZMP" as used herein refers to a point on the floor surface where the moment due to the counter force of the floor to the walling robot is reduced to nil. The expression of "ZMP trajectory" as used herein refers to the trajectory along which ZMP moves while the robot 1 is walking. The concept of ZMP and application of ZMP to the norm for judging the stability of a walling robot are described in Miomir Vukobratovic, "LEGGED LOCOMOTION ROBOTS" (Ichiro Kato et al., "Walking Robot and Artificial Feet" (NIkkan Kogyo Shinbun)).

As described above, in the robot 1, the auxiliary control sections 20, 21, . . . interpret the commands received from the main control section 11 and outputs drive control signals to the actuators $A_2, A_3 \ldots$ to control the operations of driving the units. As a result, the robot 1 can stably transit to a target attitude and walk with a stable attitude.

The control unit 10 of the robot 1 controls the attitude of the robot as described above and comprehensively processes the information from the acceleration sensor, the touch sensors and the grounding conforming sensors, the image information from the CCD camera and the sound image forming from the microphone. In the control unit 10, the main control section 11 is connected to the various sensors including the accelerations sensor, the gyro sensor, the touch sensors, the distance sensor, the microphone and the speaker, the actuators, the CCD camera and the battery by way of corresponding respective hubs (not shown).

The main control section 11 sequentially takes in the sensor data supplied from the sensors, the image data and the sound data and stores them in predetermined positions in the DRAM by way of the respective internal interfaces. Additionally, the main control section 11 sequentially takes in the battery residual capacity data for the residual capacity of the battery as supplied from the battery and stores them in predetermined positions in the DRAM. The sensor data, the image data, the sound data and the battery residual capacity data that are stored in the DRAM are utilized when the main control section 11 controls the actions of the robot 1.

In the initial stages of operation of the robot 1 when power is supplied to the robot 1, the main control section 11 reads out the control program and stores it in the DRAM. Furthermore, the main control section 11 judges the situation of the robot itself and that of the surroundings of the robot on the basis of the sensor data, the image data, the sound data and the battery residual capacity data that are sequentially stored in the DRAM by the main control section 11 in a manner as described above along with if there is an instruction or some other action given to the robot from the user or not.

Still additionally, the main control section 11 determines the behavior of the robot in response to the situation of the robot itself on the basis of the control program stored in the DRAM. At the same time, the main control section 11 makes the robot to take actions, including so-called "gestures" and "hand-waving" on the basis of the result of the determination by driving the related actuators.

In this way, the robot 1 can judge the situation of itself and that of the surroundings on the basis of the control program and autonomously behave in response to the instruction given and the action made by the user.

It may be needless to say that the present invention is by no means limited to the above described embodiment, which may be modified and altered in various different ways without departing from the scope of the invention.

What is claimed is:

1. An environment recognizing device to be used by a traveling type robot in an environment containing one or more than one obstacles in order to recognize the environment, the device comprising:
    a plane detecting device configured to compute a plane parameter on the basis of input images and to detect a plane on the basis of the plane parameter;
    an obstacle recognizing device configured to recognize an obstacle, if any, on the plane detected by the plane detecting device; and
    an environment map updating device configured to draw an environment map and/or update the existing environment map on the basis of information on the obstacle recognized by the obstacle recognizing device, wherein
    the plane detecting device is configured to detect a group of planes including a reference plane on which the robot is moving to be used as reference and one or more than one other planes substantially parallel to the reference plane, and
    the environment map updating device is configured to draw an environment map and/or update the existing environment map for the plane carrying an obstacle as recognized by the obstacle recognizing device out of the group of planes, wherein the plane detecting device includes:
    a plane computing device configured to sample three-dimensional data on three or more than three points out of the group of three-dimensional data obtained by converting the parallax image or the distance image input as the input image;
    a plane determining device configured to poll the plurality of plane parameters obtained from the plane computing device for a polling space and to determine the group of planes on the basis of the result of the polling; and
    a reliability parameter computational device for computing each of the three-dimensional data wherein the three-dimensional data whose reliability parameter is smaller than a predetermined threshold value is discarded, wherein,
    the obstacle recognizing device is configured to recognize an obstacle at least on the reference plane where the robot is moving out of the group of planes, and
    the environment map updating device is configured to draw an environment map of the reference plane where the robot is moving and/or update the existing environment map of the plane.

2. The device according to claim 1, wherein the reference plane is a floor surface.

3. The device according to claim 1, wherein each of the planes has a surface area that allows the robot to move thereon.

4. The device according to claim 1, wherein the planes other than the reference plane are planes showing a height difference not greater than a predetermined value from the reference plane.

5. The device according to claim 1, wherein the planes other than the reference plane include the plane that shows the smallest height difference from the reference plane within the scope of recognition of the robot.

6. The device according to claim 1, wherein the environment maps include obstacle regions where an obstacle is found, free space regions where the robot can move and unsurveyed regions.

7. The device according to claim 1, further comprising:
    a distance image generating device configured to generate a distance image by using the parallax image computationally obtained on the basis of the image data obtained from a plurality of imaging devices arranged in the robot and a homogeneous transformation matrix corresponding to the parallax image at the positions where the plurality of imaging devices are arranged; and
    the plane detecting device is configured to compute the plane parameters on the basis of the distance image.

8. An environment recognizing method to be used by a traveling type robot in an environment containing one or more than one obstacles in order to recognize the environment, the method comprising:
    computing a plane parameter on the basis of input images;
    detecting a plane on the basis of the plane parameter, including detecting a group of planes including a reference plane on which the robot is moving to be used as reference and one or more than one other planes substantially parallel to the reference plane;
    recognizing an obstacle, if any, on the plane detected; and
    updating for drawing an environment map and/or updating the existing environment map on the basis of information on the obstacle recognized during obstacle recognizing, including drawing an environment map and/or updating the existing environment map for the plane carrying an obstacle as recognized in the recognizing out of the group of planes, wherein the plane detecting includes:

plane sampling of three-dimensional data on three or more than three points out of the group of three-dimensional data obtained by converting the parallax image or the distance image input as the input image; and plane polling of the plurality of plane parameters obtained from the plane sampling for a polling space and determining the group of planes on the basis of the result of the polling;

computing a reliability parameter for each of the three-dimensional data wherein the three-dimensional data whose reliability parameter is smaller than a predetermined threshold value is discarded, wherein, the recognizing an obstacle recognizes an obstacle at least on the reference plane where the robot is moving out of the group of planes, and the updating for drawing an environment map draws an environment map of the reference plane where the robot is moving and/or updates the existing environment map of the plane.

9. The method according to claim 8, wherein the reference plane is a floor surface.

10. The method according to claim 8, wherein each of the planes has a surface area that allows the robot to move thereon.

11. The method according to claim 8, wherein the planes other than the reference plane are planes showing a height difference not greater than a predetermined value from the reference plane.

12. The method according to claim 8, wherein the planes other than the reference plane include the plane that shows the smallest height difference from the reference plane within the scope of recognition of the robot.

13. A robot adapted to move autonomously in an environment containing one or more than one obstacles and having an environment recognizing device for recognizing the environment thereof; the environment recognizing device comprising:

a plane detecting device configured to compute a plane parameter on the basis of input images and to detect a plane on the basis of the plane parameter;

an obstacle recognizing device configured to recognize an obstacle, if any, on the plane detected by the plane detecting device; and an environment map updating device configured to draw an environment map and/or update the existing environment map on the basis of information on the obstacle recognized by the obstacle recognizing device, wherein the plane detecting device is configured to detect a group of planes including a reference plane on which the robot is moving to be used as reference and one or more than one other planes substantially parallel to the reference plane, and the environment map updating device is configured to draw an environment map and/or update the existing environment map for the plane carrying an obstacle as recognized by the obstacle recognizing device out of the group of planes, wherein the plane detecting device includes:

a plane computing device configured to sample three-dimensional data on three or more than three points out of the group of three-dimensional data obtained by converting the parallax image or the distance image input as the input image;

a plane determining device configured to poll the plurality of plane parameters obtained from the plane computing device for a polling space and to determine the group of planes on the basis of the result of the polling; and a reliability parameter computational device for computing each of the three-dimensional data wherein the three-dimensional data whose reliability parameter is smaller than a predetermined threshold value is discarded, wherein, the obstacle recognizing device is configured to recognize an obstacle at least on the reference plane where the robot is moving out of the group of planes, and the environment map updating device is configured to draw an environment map of the reference plane where the robot is moving and/or update the existing environment map of the plane.

* * * * *